US009959455B2

(12) United States Patent
Young et al.

(10) Patent No.: US 9,959,455 B2
(45) Date of Patent: *May 1, 2018

(54) SYSTEM AND METHOD FOR FACE RECOGNITION USING THREE DIMENSIONS

(71) Applicant: U.S. Army Research Laboratory ATTN: RDRL-LOC-I, Washington, DC (US)

(72) Inventors: Shiqiong Susan Young, Bethesda, MD (US); Jinwei Ye, Elkton, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/647,238

(22) Filed: Jul. 11, 2017

(65) Prior Publication Data
US 2018/0005018 A1    Jan. 4, 2018

Related U.S. Application Data

(63) Continuation-in-part of application No. 15/198,344, filed on Jun. 30, 2016.

(51) Int. Cl.
*G06K 9/00* (2006.01)
(52) U.S. Cl.
CPC ..... *G06K 9/00268* (2013.01); *G06K 9/00228* (2013.01); *G06K 9/00288* (2013.01)
(58) Field of Classification Search
CPC ........... G06K 9/00268; G06K 9/00201; G06K 9/00281; G06K 9/00597; G06K 9/00288;
(Continued)

(56) References Cited

U.S. PATENT DOCUMENTS 5,933,527 A * 8/1999 Ishikawa ............ G06K 9/00268
382/118
6,047,078 A    4/2000 Kang
(Continued)

FOREIGN PATENT DOCUMENTS

CN    CN103279987 A    8/2015

OTHER PUBLICATIONS

Z.L. Sun, et al.,"Depth Estimation of Face Images Using the Nonlinear Least-squares Model", IEEE Transaction on Image Processing, 22(1): 17-30, (Jan. 2013).
(Continued)

*Primary Examiner* — Ali Bayat
(74) *Attorney, Agent, or Firm* — Lawrence E. Anderson

(57) ABSTRACT

A system for facial recognition comprising at least one processor; at least one input operatively connected to the at least one processor; a database configured to store three-dimensional facial image data comprising facial feature coordinates in a predetermined common plane; the at least one processor configured to locate three-dimensional facial features in the image of the subject, estimate three-dimensional facial feature location coordinates in the image of the subject, obtain the three-dimensional facial feature location coordinates and orientation parameters in a coordinate system in which the facial features are located in the predetermined common plane; and compare the location of the facial feature coordinates of the subject to images of people in the database; whereby recognition, comparison and/or likeness of the facial images is determined by comparing the predetermined common plane facial feature coordinates of the subject to images in the database. A method is also disclosed.

20 Claims, 23 Drawing Sheets

(58) Field of Classification Search
CPC ........... G06K 9/00248; G06K 9/00255; G06K 9/00228; G06K 9/00295; G06K 9/00617; G06F 17/30256; G06T 7/68; G06T 7/74; G06T 7/75

See application file for complete search history.

(56) References Cited

U.S. PATENT DOCUMENTS

| | | | |
|---|---|---|---|
| 6,947,579 | B2 | 9/2005 | Bronstein et al. |
| 7,043,056 | B2* | 5/2006 | Edwards ............ G06K 9/00248 382/103 |
| 7,221,809 | B2 | 5/2007 | Geng |
| 7,433,024 | B2 | 10/2008 | Garcia |
| 7,620,217 | B2 | 11/2009 | Chen et al. |
| 7,876,931 | B2* | 1/2011 | Geng ................. G06K 9/00201 345/419 |
| 2005/0111705 | A1 | 5/2005 | Waupotitsch |
| 2006/0078172 | A1 | 4/2006 | Zhang et al. |
| 2007/0127787 | A1* | 6/2007 | Castleman ......... G06K 9/00248 382/118 |
| 2012/0293635 | A1 | 11/2012 | Sharma |
| 2013/0097194 | A1 | 4/2013 | Braga et al. |
| 2015/0077326 | A1 | 3/2015 | Kramer et al. |

OTHER PUBLICATIONS

R..I. Hg, et al. entitled "An RGB-D Database Using Microsoft's Kinect for Windows for Face Detection," Eighth International Conference on Signal Image Technology and Internet Based Systems, Naples, pp. 42-46 ( Nov. 2012).
Kakadiaris. I..A., et al., "Three-dimensional Face Recognition in the Presence of Facial Expressions: an Annotated Deformable Model Approach," IEEE Transactions on Pattern Analysis and Machine Intelligence, 29(4): 640-649, (2007).
B.Y. Li, et al., "Using Kinect for Face Recognition Under Varying Poses, Expressions, Illumination and Disguise," IEEE Workshop on Applications of Computer Vision, Tampa, FL, pp. 186-192 (2013).
G. Goswami, et al.,"On RGB-D Face Recognition Using Kinect," IEEE Sixth International Conference on Biometrics: Theory, Applications and Systems, Arlington, VA (2013).
T. Huynh, et al."An Efficient LBP-based Descriptor for Facial Depth Imagess Applied to Gender Recognition Using RGB-D face data," ACCV Workshop on Computer Visioin with Local Binary Pattern Variants, Daejeo, Korea, (Nov. 5-6, 2012).
M. Hossny,et al, "Low Cost Multimodal Facial Recognition via Kinect Sensors," Proceedings of the 2012 Land Warfare Conference, Melbourne, Victoria (2012).
M.A. Turk, et al, "Face Recognition Using Eigen Faces," Proceedings of IEEE Computer Vision and Pattern Recogntion (CVPR), pp. 586-591 (1991).
Passalis, G., et al., "Using Facial Symmetry to Handle Pose Variations in Real-world 3D Face Recognition," IEEE Transactions on Pattern Analysis and Machine Intelligence, 33(10): 1938-1951, (2011).
L. Guibas, et al., "Primitives for the Manipulation of General Subdivisions and the Computation of Voronoi Diagrams," ACM Transaction on Graphics, 4(2): 74-123, Apr. 1985.
E. W. Dijkstra, "A Note on two Problems in Connexion with Graphs," Numerische Mathematik 1, 269-271, 1959.
Wei Yang, Yu Ji, Jinwei Ye, S. Susan Young and Jingyi Yu. "Coplanar Common Points in Non-Centric Cameras," Proceedings of the European Conference on Computer Vision (ECCV) 2014.
Zhao, W., "Face Recognition: a Literature Survey," ACM Computing Surveys, vol. 35, No. 4, pp. 399-458, Dec. 2003.
Zhang, Zhengyou, "Microsoft Kinect Sensor and Its Effect," IEEE Computer Society, ieeexplore.ieee.org/document/6190806/ (2012).
R. Chellappa, et al., "Human and Machine Recognition of fFaces: A Survey", Proceedings of the IEEE, 83(5): 705-740, May 2005.
S. S Young, "Optimized Target Localization in Stereotactic Radiosurgery Using Real-time Digital Portal Images," Phys. Med. Biol. vol. 41, pp. 1621-1632, 1996.
S. Liang, et al., "Improved Detection of Landmarks on 3D Human Face Data," Proceedings of the 35th Annual International Conference of the IEEE Engineering in Medicine and Biology Society, Japan, Osaka, Jul. 2013.

* cited by examiner

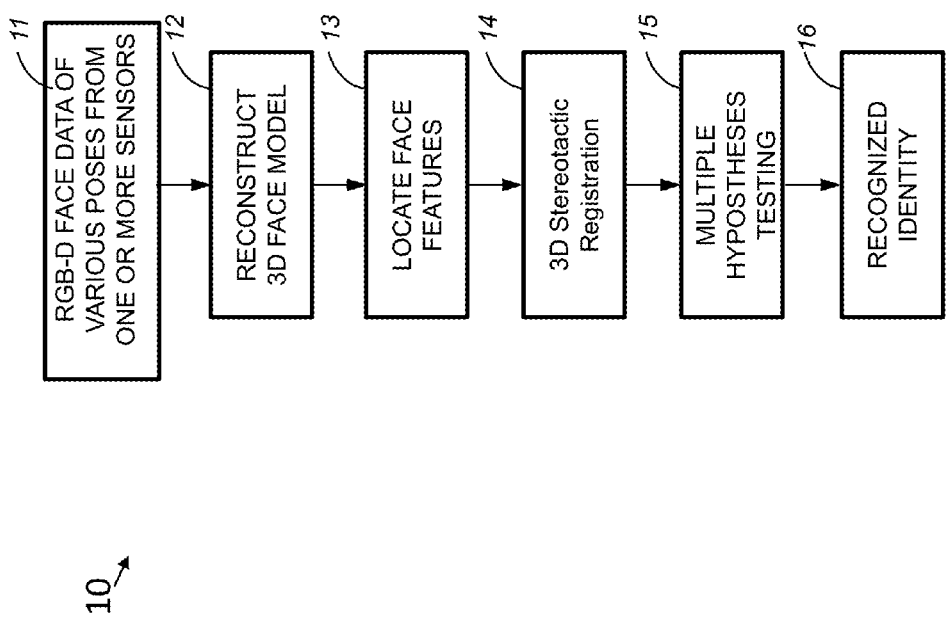

FIG. 2

[21] Preferred embodiment enables usage of 3-D depth images of subjects (suspects) captured with faces not pointed directly at the 3-D camera. 3-D images contain yaw (pose rotation left and right), pitch (head tilt rotation (up and down)), and roll (in plane rotation).

[22] Preferred embodiment utilizes measurements extracted from location of the two eyes (inner and outer points), mouth (left and right sides) and (optionally) nose tip (7 POINTS TOTAL).

[23] Vector ($V_P$) comprises set of 11 parameters $V_P$ by which yawl, pitch, and roll are incorporate into unified coordinate System (UCS):

$$V_P = (a_1, a_2, a_3, a_4, a_5, a_6, a_7, a_8, \theta, \phi, \psi)$$

Where $a_1, a_2, a_3, a_4, a_5, a_6, a_7, a_8$ are independent of yaw, pitch, and roll, and where $\theta$, $\phi$, and $\psi$ are used in a Gaussian Least Squares Differential correction (GLSDC) minimization procedure to perform the conversion.

[24] Inputted facial features are transformed to a new coordinate system (UCS) and matching, recognition, and/or identification is performed.

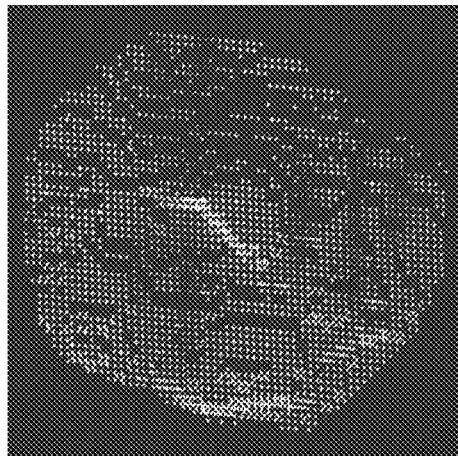
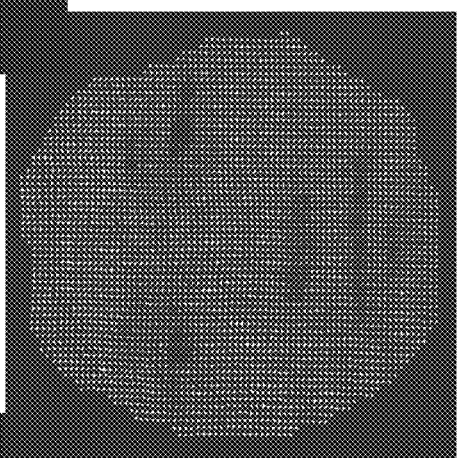
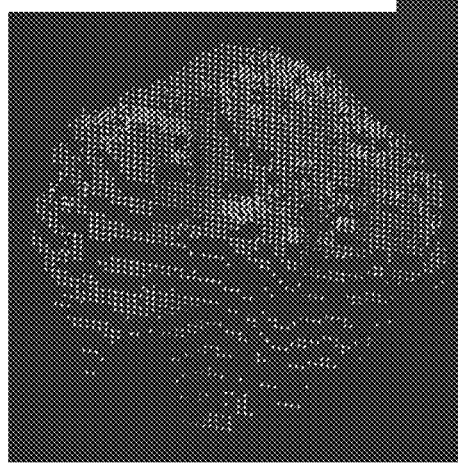
FIG. 17A
FIG. 17B
FIG. 17C

FIG. 18A
FIG. 18B
FIG. 18C
| θ | -32.91° | 0.86° | 25.96° |
| φ | 8.75° | 5.40° | 10.32° |
| ψ | 3.57° | 0.39° | -3.01° |
FIG. 18D
Numbers in table correspond to the yaw, pitch and roll angles of the three poses.

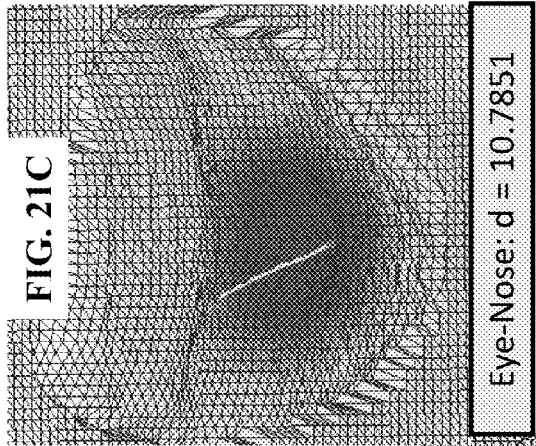
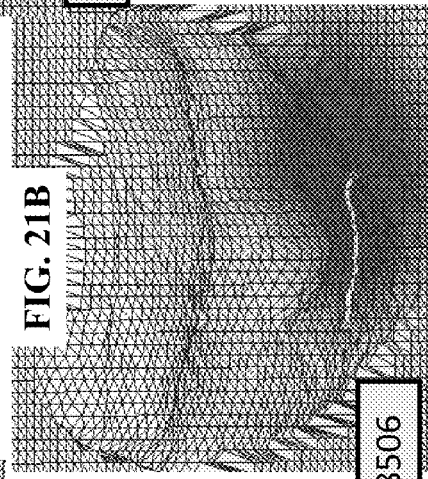
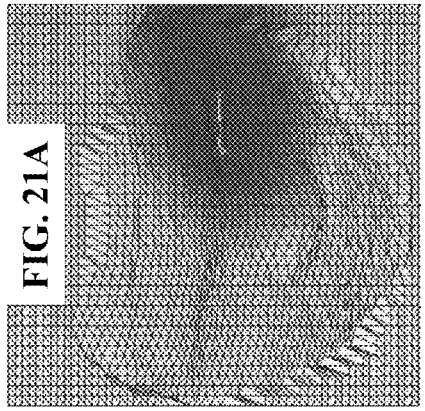
FIG. 21A
FIG. 21B
FIG. 21C
Eye: d = 5.7570
Images are derived using Kinect sensor. Units are Kinect units
Eye-Nose: d = 10.7851
Mouth: d = 12.8506
Distance shown is the Geodesic distance (measured along the surface).

| Matching Scores | 1 | 2 | 3 | 4 | 5 | 6 | 7 | 8 | 9 | 10 |
|---|---|---|---|---|---|---|---|---|---|---|
| 1 | 0.058153 | 0.216693 | 0.530655 | 0.453715 | 0.250462 | 0.219097 | 0.217565 | 0.247855 | 0.209286 | 0.300025 |
| 2 | 0.341495 | 0.118804 | 0.763071 | 0.655163 | 0.44267 | 0.27908 | 0.378518 | 0.303657 | 0.382676 | 0.382952 |
| 3 | 0.485134 | 0.641603 | 0.08786 | 0.226763 | 0.394114 | 0.572535 | 0.48748 | 0.522855 | 0.390195 | 0.597241 |
| 4 | 0.419499 | 0.557192 | 0.246987 | 0.084301 | 0.391237 | 0.492617 | 0.384857 | 0.423814 | 0.308957 | 0.552127 |
| 5 | 0.265473 | 0.252317 | 0.505165 | 0.449224 | 0.161001 | 0.313509 | 0.334968 | 0.185338 | 0.268771 | 0.407032 |
| 6 | 0.262369 | 0.290485 | 0.627421 | 0.536765 | 0.448038 | 0.110949 | 0.195885 | 0.363332 | 0.231132 | 0.107248 |
| 7 | 0.286592 | 0.425675 | 0.506614 | 0.39127 | 0.446362 | 0.278256 | 0.171366 | 0.410826 | 0.227957 | 0.327046 |
| 8 | 0.210336 | 0.219583 | 0.543223 | 0.439444 | 0.246362 | 0.187248 | 0.192959 | 0.148721 | 0.204471 | 0.316495 |
| 9 | 0.260006 | 0.294887 | 0.480581 | 0.365438 | 0.370479 | 0.218774 | 0.208823 | 0.290783 | 0.110202 | 0.279478 |
| 10 | 0.301822 | 0.326491 | 0.623378 | 0.561507 | 0.477456 | 0.192998 | 0.282299 | 0.417806 | 0.253707 | 0.059558 |

FIG. 22

SYSTEM AND METHOD FOR FACE RECOGNITION USING THREE DIMENSIONS

GOVERNMENT INTEREST

The embodiments herein may be manufactured, used, and/or licensed by or for the United States Government without the payment of royalties thereon.

CROSS-REFERENCE TO RELATED APPLICATIONS

This application claims priority to U.S. patent application Ser. No. 15/198,344 entitled System and Method for Face Recognition with Two-Dimension Sensing Modality" by Dr. Shiqiong Susan Young, filed Jun. 30, 2016, herein incorporated by reference.

BACKGROUND OF THE INVENTION

In automatic face recognition an unknown subject is identified by inputting a facial image into a gallery of previously identified persons. The database of stored images is referred to as a gallery or watch list and the inputted image or video is usually referred to as a probe.

Biometric identifiers are distinctive, measurable characteristics used to label and describe individuals. Facial images commonly use biometric characteristic, as are images of the iris, finger prints, gait, etc. Accurate and reliable face recognition can be utilized for surveillance and security tasks (i.e. entrance security, law enforcement, criminal record identification, etc.).

Two-dimensional facial recognition may not offer effective facial recognition due to different illuminations, expressions and poses/viewpoints. Use of three-dimensional (3-D) face models preserves the geometric structure of a face despite illumination, expressions and pose variables. For example, U.S. Pat. No. 7,620,217, entitled "Three-dimensional face recognition system and method", by W.-C. Chen, et al, herein incorporated by reference, discloses a generalized framework for the three-dimensional face recognition. U.S. Patent Publication No. 2006/0078172 entitled "3D Face Authentication and Recognition Based on Bilateral Symmetry Analysis," by L. Zhang, et al., herein incorporated by reference, discloses the use of curvatures for 3-D face profile recognition and authentication.

Since depth information is lost in a two-dimensional image, construction of 3-D models from 2D images requires specific algorithms and sensors. Examples of attempts to obtain a 3-D representation of a human face include U.S. Pat. No. 6,047,078, entitled "Method for Extracting a Three-dimensional Model Using Appearance-based Constrained Structure from Motion," by S. B. Kang, herein incorporated by reference, which discloses creation of a 3-D face model from a sequence of temporally related 2-D images by tracking the facial features. In the publication by Z. L. Sun, et al., entitled "Depth Estimation of Face Images Using the Nonlinear Least-squares Model", IEEE Transaction on Image Processing, 22(1): 17-30, (January 2013), the three-dimensional structure of a human face is reconstructed from its corresponding 2-D images with different poses. The depth values of feature points are estimated by a nonlinear least-square method. The appearance-based approaches require two or more input 2D images of different pose views of the subject; therefore it is difficult to apply to moving subjects. Also, 2-D images are sensitive to environment lighting.

Passive stereo sensors, as disclosed for example in U.S. Published Application No. 2005/0111705, entitled "Passive stereo sensing for 3-D facial shape biometrics", May 26, 2005, herein incorporated by reference, use two cameras to capture the object and determine the object's location in the three-dimensional space by using a triangulation technique. Although the passive stereo works well on textured scenes and has a high resolution, issues develop with occluding boundaries and difficulty with smooth regions (no textures for matching correspondences). Passive stereo requires the illumination from the environment because it does not have an active light source. It is therefore only suitable for outdoor daylight or indoor strong light scenarios and cannot be applied in low light conditions.

Range sensors or Time-of-Flight (ToF) sensors resolve depth information by measuring the time or phase changes of the emitted light from the camera to the scene point Similar to approaches based on the structured light technique, time-of-flight sensors emit active lighting of a certain spectrum into the scene and do not require additional environment light; so that they can be used in low light conditions. This class of apparatus is a popular solution in existing three-dimensional face recognition approaches due to high resolution and high speed. U.S. Pat. No. 6,947,579, entitled "Three-dimensional Face Recognition," issued September, 2005, by M. M. Bronstein, et al., discloses high precision three-dimensional representations of human faces acquired using a range camera; and the 3-D isometric face model is used to deal with expression changes. In the publication by Kakadiaris. I. A., et al., entitled "Three-dimensional Face Recognition in the Presence of Facial Expressions: an Annotated Deformable Model Approach", IEEE Transactions on Pattern Analysis and Machine Intelligence, 29(4): 640-649, (2007), a laser scanner is used to acquire the high resolution depth information. In this method, the annotated face model (AFM) is used to fit a face geometry image from three-dimensional 3-D face data to eliminate the variations caused by expressions.

Due to the high cost of Time-of-Flight or range sensors, it is not practical to deploy them in a large scale environment for surveillance purposes. It is desirable to design an affordable large-scale face recognition system that can be used in the dark/low light environment. For this reason Kinect sensors, such as disclosed in U.S. Pat. No. 7,433,024, are desirable for acquiring 3-D depth information. U.S. Pat. No. 7,433,024 entitled "Range Mapping Using Speckle Decorrelation," issued Oct. 7, 2008, by J. Garcia, et al., (herein incorporated by reference) discloses a Kinect sensor comprising color camera (with three color channels termed with red, green, and blue, RGB) and an infrared (IR) projector and receiver Similar to structured light approaches, the IR projector emits a random dotted pattern to the scene. By correlating the received pattern with the projected pattern, the depth information is resolved by stereo triangulation. Since the depth resolution acquired by the Kinect sensor is very low and detecting facial features requires high-fidelity imagery, the development of tailored algorithms optimizes usage of the Kinect sensor for face recognition.

A Kinect sensor provides a color image (called RGB image) and a depth image (called D image) of the scene. Together, they are called RGB-D images. Using the depth information from a Kinect sensor for face recognition is an active area of research. Most existing methods use a single Kinect sensor for three-dimensional face data acquisition.

The publication by R. I. Hg, et al. entitled "An RGB-D Database Using Microsoft's Kinect for Windows for Face Detection," published by the Eighth International Conference on Signal Image Technology and Internet Based Systems, Naples, (November, 2012) discloses the building of a RGB-D dataset using a Kinect sensor, comprising 1581 images of 31 targets. Using this method, faces are aligned using ae triangle formed by the two eyes and the nose. The publication by. B. Y. Li, et al., entitled "Using Kinect for Face Under Varying Poses, Expressions, Illumination and Disguise", published by IEEE Workshop on Applications of Computer Vision, Tampa, Fla. (2013) discloses the use of "dictionary learning" to fit the noisy depth data acquired by a Kinect sensor onto a canonical model. The publication by G. Goswami, et al, entitled "On RGB-D Face Recognition Using Kinect," published by IEEE Sixth International Conference on Biometrics: Theory, Applications and Systems, Arlington, Va. (2013), discloses the applcation of a histogram of gradients (HOG) feature on the entropy and salient map of both RGB and depth images for the face classification. The publication by T. Huynh, et al. entitled "An efficient LBP-based descriptor for facial depth images applied to gender recognition using RGB-D face data," published by ACCV Workshop on Computer Vision with Local Binary Pattern Variants, Daejeo, Korea, (Nov. 5-6, 2012) discloses the use of gradient local binary patterns (G-LBP) to represent faces in depth images and the application of this descriptor to identify the gender of the subject.

However, a single Kinect sensor has the limited field of view. In order to increase the field of view, there are some approaches that use multiple Kinects for the data acquisition. The publication by M. Hossny, et al, entitled "Low cost multimodal facial recognition via Kinect sensors," published by Proceedings of the 2012 Land Warfare Conference, Melbourne, Victoria (2012), discloses a system comprising three Kinect sensors on a triangular rig to capture the 3-D information of a subject and the application of Haar features to detect human faces.

The above Kinect sensor based methods consider the depth image as a regular gray image and apply traditional statisical based classification methods for recogntion, See, e.g., M. A. Turk, et al, "Face Recognition Using Eigen Faces," Proceedings of IEEE Computer Vision and Pattern Recogntion (CVPR), pp. 586-591 (1991).

Pose variation is one of the major challenges in face recognition even where three-dimensional data is available due to the reason that important facial features (i.e., eye corners and mouth corners) may be not complete in nonfrontal poses. Most existing methods exploit the facial symmetry to complete the missing data caused by the pose variation or occlusion (See, for example, the publication by G. Passalis, et al., entitled "Using Facial Symmetry to Handle Pose Variations in Real-world 3D Face Recognition," published by IEEE Transactions on Pattern Analysis and Machine Intelligence, 33(10): 1938-1951 (2011); and the publication by B. Y. Li, et al., entitled "Using Kinect for Face Recognition Under Varying Poses, Expressions, Illumination and Disguise," published by IEEE Workshop on Applications of Computer Vision, Tampa, Fla. (2013). However, the completed face information obtained by this method lacks accuracy because the estimation was based on a hypothetic model. Taking a different approach, U.S. Published Application No. 20120293635, entitled "Head Pose Estimation Using RGBD Camera," issued Nov. 22, 2012, by P. Sharma, et al, (herein incorporated by reference) discloses multiple temporal-related depth images and application of an extended Kalman filter to estimate the 3-D head poses (translations and rotations) with respect to a reference pose. The accuracy of this approach was determined by the number of depth images.

It is also known in the art to connect a plurality of Kinects to obtain 3-D images. For example, Chinese Patent No. CN103279987A, by Huarong, et al., herein incorporated by reference, discloses an object fast three-dimensional modeling method based on Kinect comprising the steps of: (step 1) fixing the relative positions of each Kinect and a rotating platform, enabling all Kinects to directly face the rotating platform with different visual angles respectively to obtain a relatively integral object model; (step 2) placing an object to be reconstructed in the center of the rotating platform, starting a system to carry out reconstruction on the object, achieving scene modeling on the scene depth information output by the Kinect by using a three-dimensional vision theory, unifying the scene depth information of Kinect locating in different coordinate systems on an identical coordinate system; (step 3) filtering wrong three-dimensional point clouds by using a removing method base on normal correction, specifically, obtaining the dense three-dimensional point clouds of scene depth information through the step 2, extracting the normal information of the three-dimensional point clouds, constructing exterior point judgment functions based on local normal constraint, judging the data of the three-dimensional point clouds which does not meet the local normal constraint as exterior points, and removing the exterior points; and (step 4) obtaining a three-dimensional model of the object.

SUMMARY

A preferred method for facial recognition comprises:

inputting image data representing a plurality of images from a database; the database comprising images of people wherein the location of the three dimensional facial features is defined relative to a predetermined common plane;

inputting an image of a subject to be identified;

locating predetermined three-dimensional facial features in the image of the subject for comparison to the image data from the database;

estimating three-dimensional facial feature location coordinates of the subject head in the image of the subject;

obtaining the three-dimensional facial feature location coordinates and orientation parameters in a coordinate system in which the facial features are located in the predetermined common plane;

comparing the location of the coordinates of the subject to the locations of the coordinates of the images of people in the database; and determining the identity of the subject.

Optionally, the facial features comprise the eyes, nose and mouth of a subject and the coordinates of the location of the facial features are defined as the location of eye corners, nose tip and mouth corners; and the predetermined common plane is a vertical plane passing the midpoints of the eye corners and mouth corners; and wherein the orientation parameters correlate to the yaw pitch and roll of the subject's head. Optionally, the step of obtaining the three-dimensional facial feature location coordinates and orientation parameters comprises estimating the three-dimensional orientation of the subject's head. As a further option, the yaw, pitch and roll of each head in the database of images of people is approximately the same since all facial features are specified relative to a predetermined common plane comprising the centers of the eye corners and mouth corners. As an additional option, a plurality of geodesic distances between facial coordinates of the subject are determined and matched against the geodesic distances between facial coordinates of the image data in the database. The step of inputting an image of a subject to be identified may optionally comprise generating point clouds and/or surface meshes depicting the subject's head using at least one three-dimensional image sensor. The step of obtaining three-dimensional facial feature location coordinates and orientation parameters may optionally comprise estimating the three dimensional orientation of the subject's head and scale; and further comprises transforming the three-dimensional facial feature location coordinates of the corners of the eyes, nose tip, and corners of the mouth of the subject into corresponding coordinates relative to a vertical plane containing the midpoints of the corners of the eyes and corners of the mouth using a Gaussian Least Squares Differential Correction (GLSDC) minimization procedure. For each image of a person in the database, the method may optionally comprise:

locating predetermined three-dimensional facial features in the image of the person;

estimating three-dimensional facial feature location coordinates;

obtaining the three-dimensional facial feature location coordinates and orientation parameters relative to a coordinate system defined by the location of facial features relative to the predetermined common plane.

A preferred embodiment of the present invention comprises:

at least one processor;

at least one input operatively connected to at least one processor and configured to input at least one image of a subject to be identified;

a database configured to store three-dimensional facial image data comprising facial feature coordinates in a predetermined common plane;

the at least one processor configured to locate predetermined three-dimensional facial features in the image of the subject, estimate three-dimensional facial feature location coordinates of the subject head in the image of the subject, and obtain the three-dimensional facial feature location coordinates and orientation parameters relative to a coordinate system in which the facial features are located in the predetermined common plane; and compare the location of the facial feature coordinates of the subject to the locations of the facial feature coordinates of the images of people in the database;

whereby recognition comparison and/or likeness of the facial images is determined by comparing the predetermined common plane facial feature coordinates of the subject to the predetermined common plane facial feature coordinates of the images in the database.

As an option, a preferred embodiment may utilize facial features comprising eyes, nose and mouth of a subject and the facial features coordinates may be the location of eye corners, nose tip and mouth corners; and the predetermined common plane may be a vertical plane containing the centers of the eye corners and mouth corners; and orientation parameters may correlate to the yaw pitch and roll of the subject's head.

As a further, the database may be configured to store a plurality of geodesic distances between facial feature coordinates of the images of people in the database and the at least one processor determines geodesic distances between facial feature coordinates of the subject and matches the geodesic distances against the geodesic distances between facial coordinates of the images of people in the database. Another option is use at least one three-dimensional image sensor configured to generate point clouds and/or surface meshes depicting the subject's head. The at least one processor may be configured to obtain the three-dimensional facial feature location coordinates and orientation parameters in a coordinate system in which the facial features are located in the predetermined common plane using a Gaussian Least Squares Differential Correction (GLSDC) minimization procedure.

Another preferred method of facial recognition comprises:

inputting image data representing a plurality of images from a database; the database comprising images of people wherein the location of the facial features is defined relative to a predetermined common plane;

inputting a plurality of images of a subject to be identified from at least one image sensor;

locating predetermined three-dimensional facial features in the image of the subject for comparison to the image data from the database;

estimating three-dimensional facial feature location coordinates of the subject head in the image of the subject;

obtaining the three-dimensional facial feature location coordinates and orientation parameters in a coordinate system in which the facial features are located in the predetermined common plane;

comparing the location of the coordinates of the subject to the locations of the coordinates of the images of people in the database; and determining the identity of the query subject.

Optionally, the method may be used for one of authentication and surveillance and may further comprise:

selectively activating a device based upon the likeness, resemblance and/or comparison of the subject to images of people in the database; and wherein the step of obtaining the three-dimensional facial feature location coordinates and orientation parameters comprises using a Gaussian Least Squares Differential Correction (GLSDC) minimization procedure.

These and other embodiments will be described in further detail below with respect to the following figures.

BRIEF DESCRIPTION OF THE DRAWINGS

FIG. 1 is a schematic illustration of a flow chart of a preferred embodiment of the present invention.

FIG. 2 is an illustration of a preferred embodiment procedure depicting the input of 3-D depth images of subjects (suspects) that are captured with faces not pointed directly at a 3-D camera (Box 21).

FIGS. 17A-17C show examples of three 3-D pre-models (3-D facial point cloud) taken using a Kinect sensor with three different poses in different directions that are transformed into the UCS domain.

FIG. 17A is an example of the registered face model from a face pre-model with the left (30 degree) pose.

FIG. 17B is an example of the registered face model from a face pre-model with the frontal (0 degree) pose.

FIG. 17C is an example of the registered face model from a face pre-model with the right (−30 degree) pose.

FIG. 18A-E shows the preferred embodiment transformation results on the same subject using the single face approach vs. multiple face approach.

FIG. 18A illustrates the left side pose of the subject.

FIG. 18B illustrates the frontal pose of the subject.

FIG. 18C illustrates the right side pose of the subject.

FIG. 18D shows three groups of the preferred embodiment rotation parameters $\{P_r^i\}$, i=1, 2, 3 for the same three poses that are obtained using three face pre-models.

FIG. 18E displays the preferred embodiment face plane parameters $P_f$ that are obtained using three face pre-models and single face pre-model.

FIGS. 21A through 21C illustrate 3 examples of the geodesic distances computed between the facial landmarks.

FIG. 21A illustrates the geodesic distance between the corners of right eye.

FIG. 21B illustrates the geodesic distance between the corners of mouth.

FIG. 21C illustrates the geodesic distance between the nose tip and the left eye inner corner.

FIG. 22 is an illustration of a table showing the recognition results of matching scores of 10 cross-compared faces.

Figure 3:
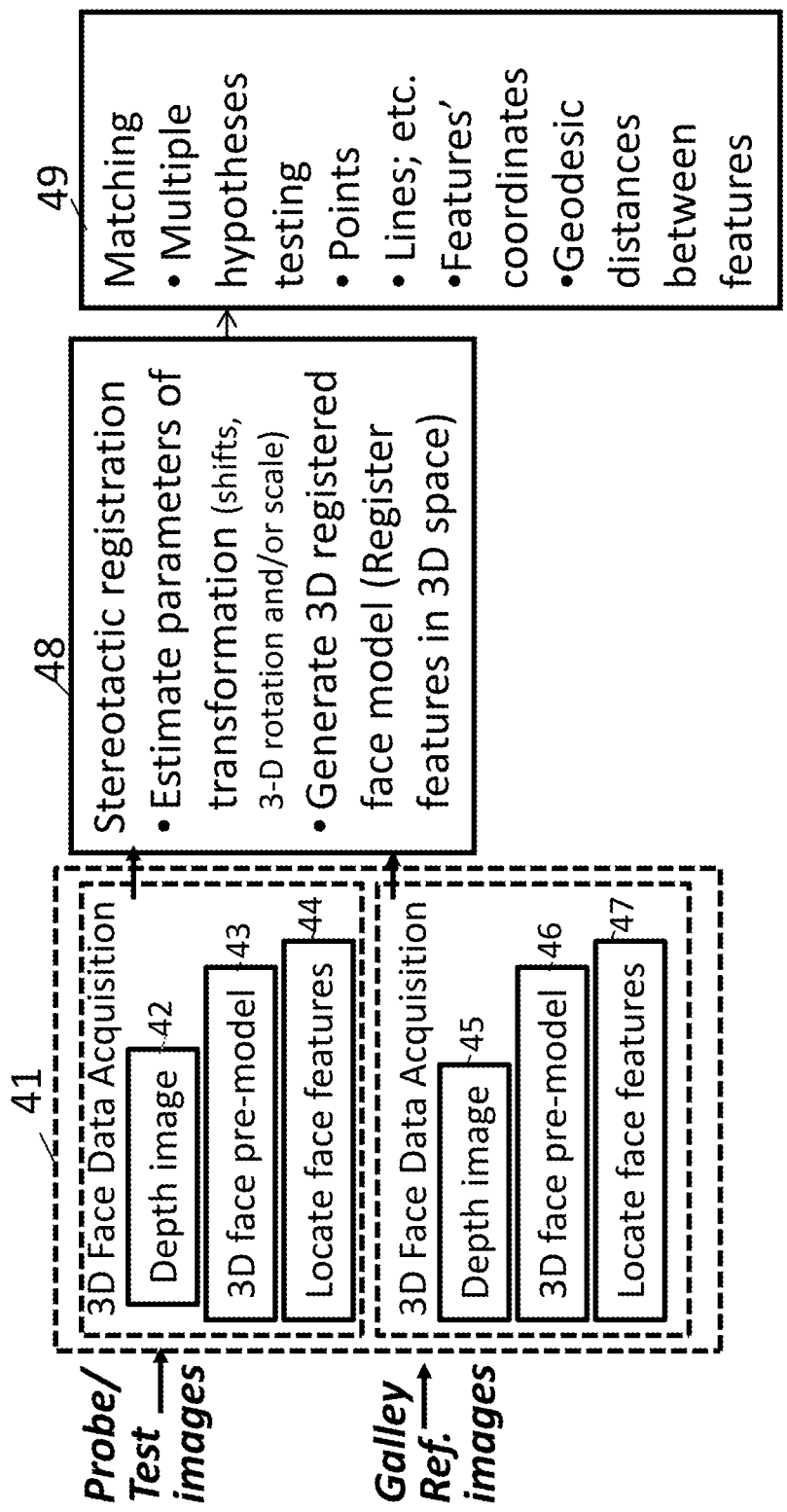
FIG. 3 schematically illustrates an overview of a preferred embodiment procedure comprising 3-D data acquisition, registration and generation of face model, and matching using multiple hypothesis testing.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. The singular forms "a", "an" and "the" are intended to include the plural forms as well, unless the context clearly indicates otherwise. Use of the terms "comprises" and/or "comprising" in this specification specifies the presence of stated features, integers, steps, operations, elements, and/or components, but does not preclude the presence or addition of one or more other features, integers, steps, operations, elements, components, and/or groups thereof.

In this application the terms first, second, etc. may be used to describe various ranges, elements, components, regions, layers and/or sections. These elements, components, regions, layers and/or sections should not be limited by these terms. For example, when referring first and second areas, these terms are only used to distinguish one area from another area. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent.

As used herein the terminology "substantially all" means for the most part; essentially all.

As may be used herein, the term "significantly" means of a size and/or effect that is large or important enough to be noticed or have an important effect.

This description and the accompanying drawings that illustrate inventive aspects and embodiments should not be taken as limiting the scope of the invention. Modifications may be made without departing from the scope of the invention defined in the claims. Details of known structures and techniques have not been shown or described in detail for clarity and so as to not to obscure the invention. The drawings are not to scale and relative sizes of components are for illustrative purposes only and do not reflect the actual sizes that may occur in any actual embodiment of the invention. In accordance with the MPEP like numbers in two or more figures represent the same or similar elements. Elements and their associated aspects that are described in detail with reference to one embodiment may, whenever practical, be included in other embodiments in which they are not specifically shown or described. If an element is described in detail with reference to one embodiment, it may not be described with in the description of the second embodiment, but the intention is to incorporate the element by reference into the second embodiment and the element may nevertheless be claimed as included in the second embodiment.

The preferred or alternate embodiments of the present invention described in this application and illustrated using cross-section illustrations are schematic in nature and represent idealized embodiments. Thus, variations from the shapes of the elements presented in this application are contemplated as being within the scope of the present invention and not a departure from the invention. The embodiments of the present invention are not limited to the particular shapes illustrated herein but are to include deviations in shape and sizing. The figures are schematic in nature and shapes are not precise and are not intended to limit the scope of the present invention.

Unless otherwise stated or defined, all terms (including technical and scientific terms) used herein have the meaning commonly understood by one of ordinary skill in the art to which this invention belongs. Terms, such as those defined in commonly used dictionaries, should be interpreted as having a meaning that is consistent with their meaning in the context of the relevant art and will not be interpreted in an idealized or overly formal sense unless it is expressly stated or defined otherwise.

A preferred embodiment of the present invention may be used to identify personnel targets at dark or low light conditions when the images can be obtained without external illuminations. A preferred embodiment of the present invention offers an improved system using, for example, the low-cost and high speed Kinect sensor(s) to capture the 3-D face imagery. Due to the low depth resolution of the Kinect sensor, there is a need to utilize common structures (biometric landmarks) to characterize 3-D faces from Kinect sensors. A preferred embodiment of the present invention develops 3-D face model reconstruction from a single pose input imagery via a new stereotactic registration method. As an option, to increase the effective field of view and prevent the scenario that only partial face landmarks are available from one Kinect sensor, a preferred embodiment may use multiple Kinect sensors in the system. As an option, a preferred embodiment may enable 3-D face model reconstruction from multiple pose input imagery obtained from a multiple Kinect sensor system via a registration method. Also, in order to operate in an uncontrolled environment, pose variations may be accommodated in face recognition by registering images that are acquired at different times and/or by different sensors into a common 3-D coordinate system.

FIG. 1 is a schematic illustration of a flow chart of a preferred embodiment of the present invention. In Box 11 red-green-blue-depth face data is inputted. The 3-D face data acquisition occurs for both gallery (reference image or images) and probe (subject being identified). The depth image of the subject may be captured by a sensor such as the Kinect sensor. However, the present invention is not limited to Kinect sensors. A three-dimensional face pre-model is reconstructed from the input depth information (Box 12). Facial landmark coordinates as face features are located from the 3-D face pre-model (Box 13). In order to consider pose variations in an uncontrolled environment, a new 3-D registration method is developed by a process referred to herein a 3-D stereotactic registration method. The 3-D face pre-model is transformed into the unified coordinate system (UCS) and the 3-D registered face model is generated (Box 14). The facial features are arranged in a facial plane in which the midpoints of the corners of the eyes and corners of the mouth are in the same vertical plane (14). In Box 15, multiple hypotheses testing may be performed as a matching method on the registered 3-D face models between gallery and probe under a unified coordinate system either based on facial landmark features or geodesic distances between features to recognize the identity of the subject (Box 16).

FIG. 2 is an illustration of a preferred embodiment procedure in depicting the input of 3-D depth images of subjects (suspects) that are captured with faces not pointed directly at a 3-D camera (Box 21). The 3-D images may contain yaw (pose rotation left and right), pitch (head tilt rotation (up and down)), and roll (in plane rotation). A preferred embodiment utilizes measurements extracted from location of the two eyes (inner and outer points), mouth (left and right sides) and nose tip (7 points) (Box 22). In Box 23, the inputted data is converted into a parameter vector ($V_P$)

comprises set of 11 parameters $V_P$ by which yaw pitch roll are incorporated what may be referred to as a unified coordinate System (UCS):

$$V_P=(a_1,a_2,a_3,a_4,a_5,a_6,a_7,a_8,\theta,\varphi,\psi)$$

where $a_1,a_2,a_3,a_4,a_5,a_6,a_7,a_8$ are independent of yaw, pitch, and roll, and where $\theta$, $\Phi$, $\Psi$, and $\alpha$ are used in a Gaussian Least Squares Differential correction (GLSDC) minimization procedure to perform the conversion. Inputted facial features are transformed to a new unified coordinate system (UCS) and matching, recognition, and/or identification is performed (Box 24).

In the following (shown in FIG. 3 and FIG. 4), 3D face data acquisition (Boxes 41 and 51), 3-D registration (Boxes 48 and 58), which is denoted herein as stereotactic registration (but the term is not intended to limit the scope of the invention in any way), including the 3-D integrated face model (Box 59), and the matching (Boxes 49 and 60), from either single pose input imagery or multiple pose input imagery, are described.

3-D Face Data Acquisition

Figure 4:
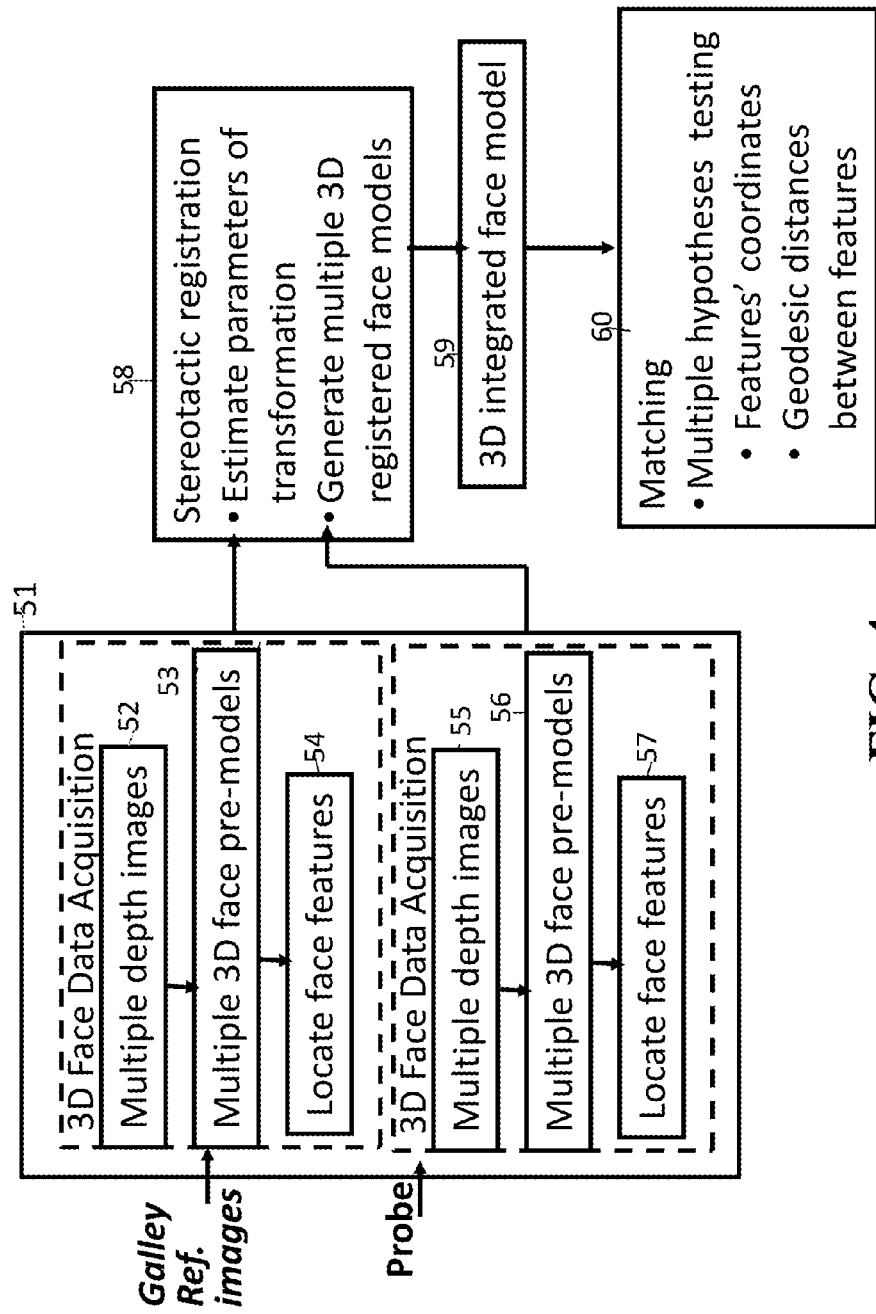
FIG. 4 schematically illustrates an overview of an alternate preferred embodiment procedure comprising 3-D data acquisition, registration and generation of multiple face models, creating a 3-D integrated face model, and matching using multiple hypothesis testing.

FIG. 3 and FIG. 4 schematically illustrate the 3-D data acquisition process (Box 41 and Box 51), which may or may not be in the form of a module, showing the steps of obtaining 3-D depth image data (Box 42 and Box 52), obtaining 3-D face pre-model data (Box 43 and Box 53), and locating face features (Box 44 and Box 54). In one embodiment of the invention (FIG. 3), a practical scenario is considered when only single pose information (one depth image) from a 3-D sensor is available as input. In another embodiment of the invention (FIG. 4), 3-D face data is obtained by a system using multiple Kinect sensors resulting in increasing the effective field of view and preventing the occurrence of inputting only partial facial features from a single Kinect sensor. For locating the face features, many algorithms are available for finding available coordinates of face features from 3-D images. In the following, described are a) configuration of a system using multiple Kinect sensors to obtain 3-D face data; and b) 3-D face pre-model reconstruction.

Referring now to FIG. 4, in Box 51, the software performs estimates of the coordinates of the features (e.g., midpoints corners of eyes and corners of mouths) relative to the inputted reference image and test image. Multiple depth images of the subject with different poses are captured by a multiple Kinect system for the purpose of increasing effective field of view and preventing partial features from single Kinect sensor (Box 52). Multiple 3-D face pre-models are reconstructed from the input depth information (Box 53). Face features are located from the 3-D face pre-models (Box 54). Multiple 3-D registered face models are generated via the registration method (Box 58). In Box 59, an integrated 3-D face model is constructed from the multiple 3-D registered face models created in Box 58 by a face model fusion operation (Box 59). In Box 60, multiple hypotheses testing is performed as a matching method on the integrated 3-D face model under the UCS domain either based on facial landmark features or geodesic distances between features to recognize the identity of the subject (Box 60).

Configuration of a System Using Multiple Kinect Sensors

In order to acquire 3-D information in low-light/dark environment, a Kinect sensor may be used for depth sensing since the Kinect sensor projects an IR light into the scene without requiring external lighting. To increase the effective field of view and prevent the partial face landmarks from one Kinect sensor, a preferred embodiment system may comprise three Kinect sensors for capturing the RGB-D images of the subject, with a processing unit for data storage and mathematical and logical computation.

Figure 5:
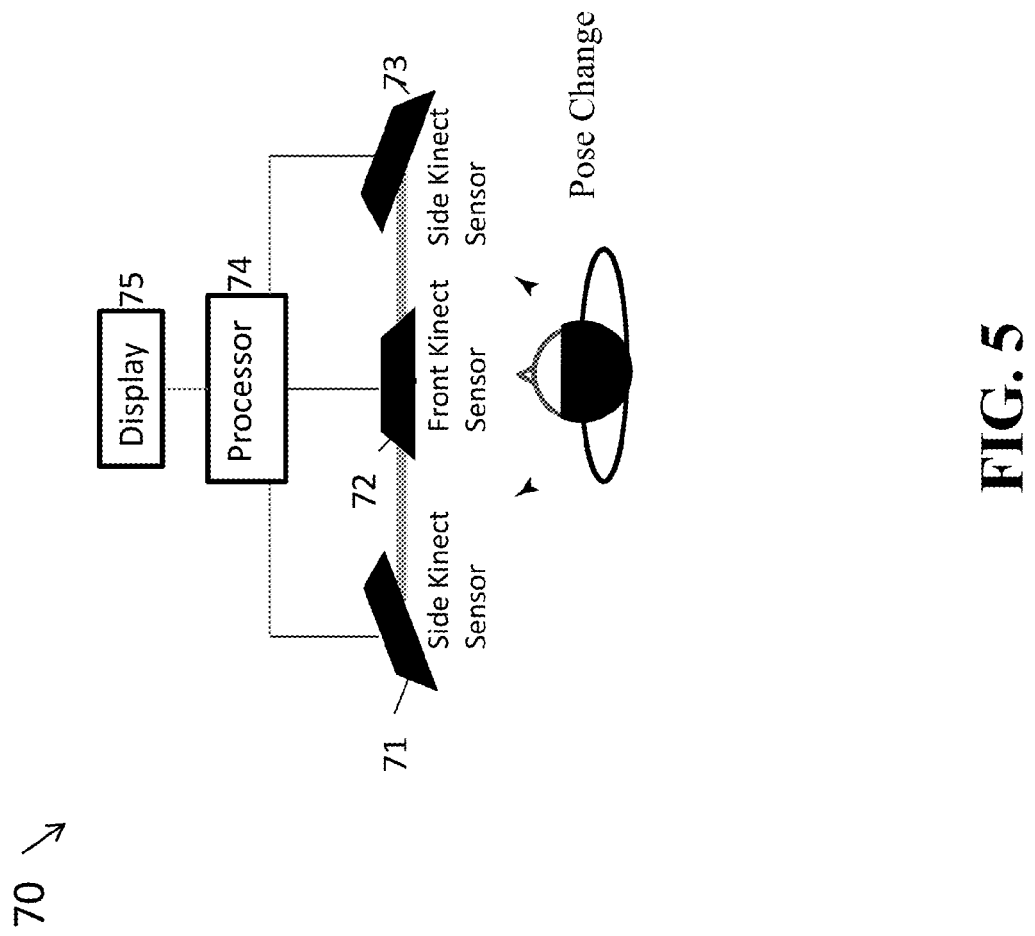
FIG. 5 is a schematic illustration of three Kinect sensors for capturing images from 3 viewpoints.

As depicted in FIG. 5, three Kinect sensors are placed on a horizontal rig that is 30 inches in length. Three Kinect sensors 71, 72, 73 are evenly positioned and horizontally spaced on a rig or frame with a spacing interval of 10 inches in between. As depicted schematically in FIG. 5, the sensors 71, 72, 73 are connected to a processor 74 which is connected to a display 75. In order to capture different poses of the subject, the Kinect sensor in the middle is facing front; the Kinect sensor on the right end of the rig is facing the subject face and tilted approximately 30 degrees; and the Kinect sensor on the left end of the rig is facing the subject's face and tilted approximately 30 degrees. Other angles may be utilized without departing from the scope of the present invention. All three Kinect sensors are pointing to the subject to acquire images with different poses or angles. In order to avoid the pattern interference, three Kinects are triggered in sequence when capturing the RGB-D images of the subject. Since the capture speed is very fast (30 frames per second), the system may be utilized with walking subjects.

To acquire a gallery of subjects of known identities, the subject is standing or sitting at a fixed distance away from the rig, facing the Kinect 72 in the middle. Consequently, RGB-D images of three poses are available in the gallery including the front (obtained from Kinect 72), left (obtained from Kinect 71), and right profiles (obtained from Kinect 73). To acquire a probe, the multiple Kinect sensor system may be placed in a fixed location in the area that needs surveillance. When a subject approaches, the system is triggered by the control unit to capture the RGB-D images of the subject. In an uncontrolled environment, a subject could approach in any direction and with various poses. Since the preferred embodiment system has three Kinect sensors (71, 72, 73) to acquire images of the subject simultaneously, the system can increase the field of view and can handle pose variations more effectively.

A Kinect sensor may be used to capture the RGB-D images of a subject as illustrated schematically in FIG. 5. However, the present invention is not limited to Kinect sensors and image sensors from a variety of sources may be utilized. Each Kinect sensor or image sensor may have three channels of red, green and blue (RGB) and the depth values (represented by the letter D) are mapped to gray scale intensities in the display. The depth image measures the depth value for each pixel location, which is aligned with the pixel location in the RGB image.

Figure 6:
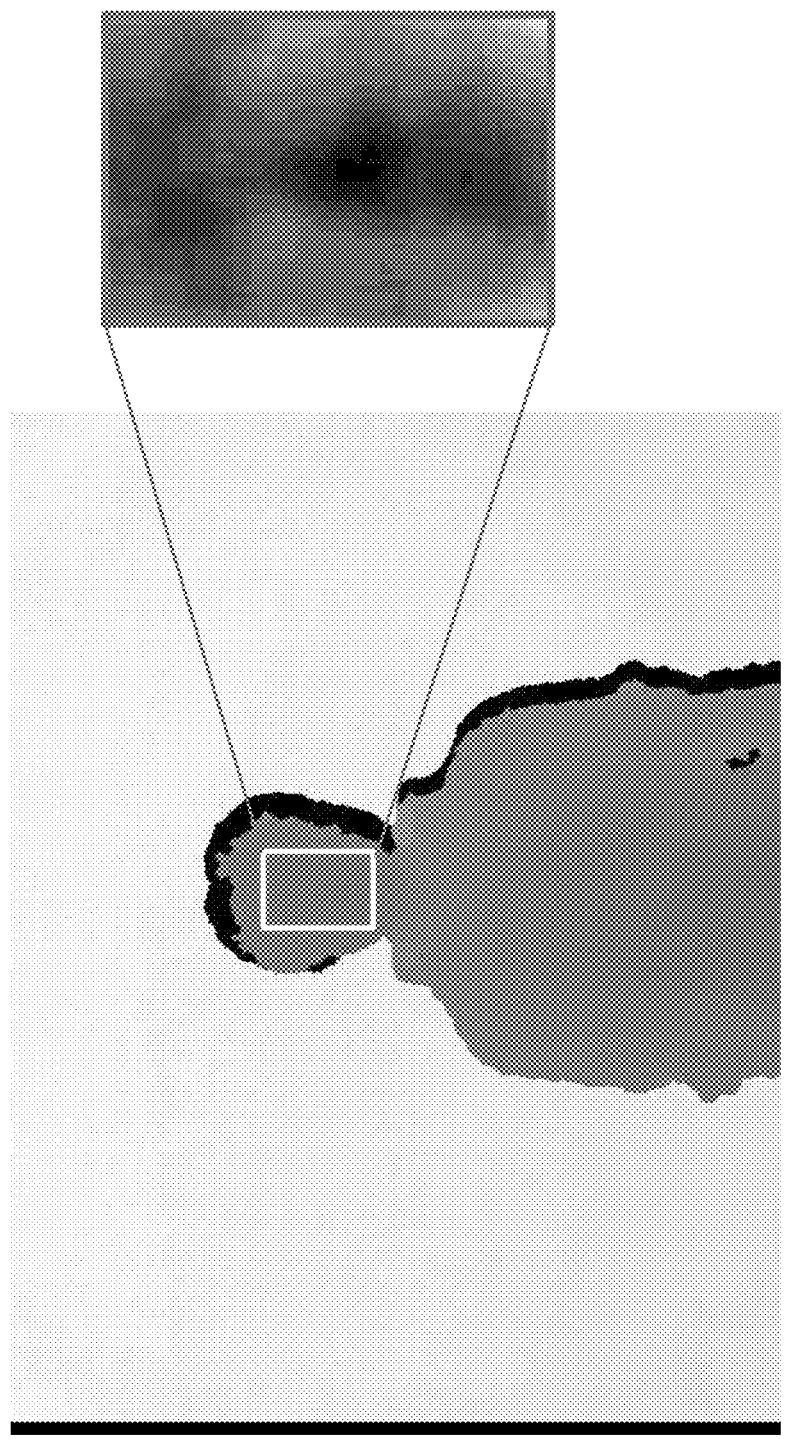
FIG. 6 is an example of a depth image captured by a Kinect sensor. The facial area of the subject is zoomed-in to demonstrate facial features.

FIG. 6 shows an example of a depth image acquired by a Kinect sensor, in which the facial area is zoomed-in in order to illustrate facial features.

3-D Face Pre-Model Reconstruction

Figure 7:
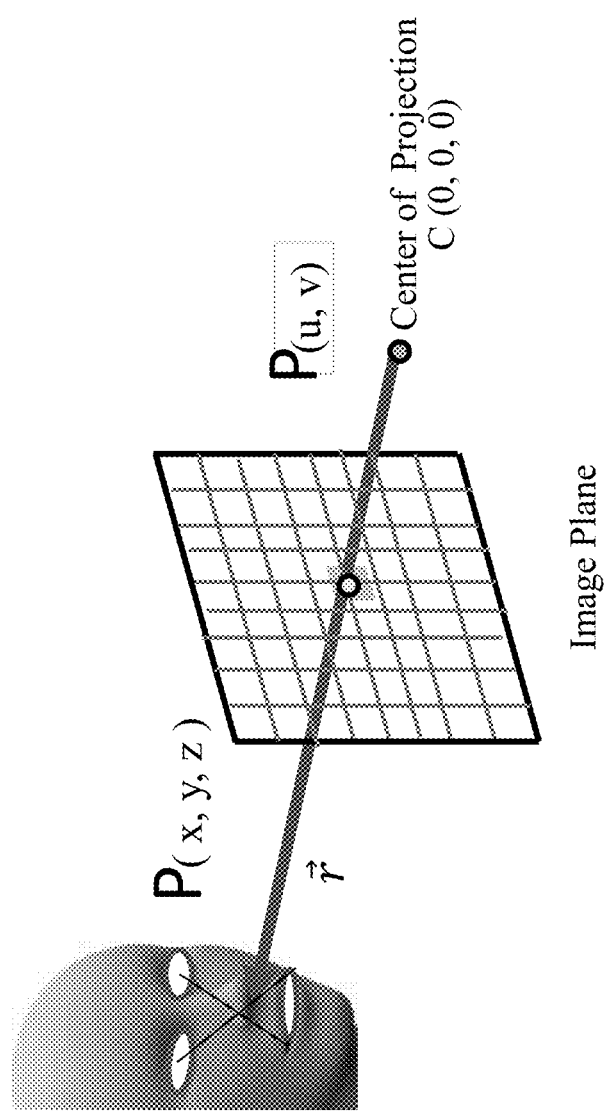
FIG. 7 is a schematic depiction of the determination of the location P(x,y,z) in the 3-D space given the depth $\check{z}$ of the point P acquired by the Kinect sensor.

As shown in FIG. 6, a 3-D point cloud is reconstructed using the depth information and the pixel location, which are acquired from the depth input image, by a ray tracing method. For each pixel $p(u,v)$ in an input image, a ray is traced from the pixel on the image plane to its corresponding point P on the subject in the 3-D space. As shown in FIG. 7, the location $P(x,y,z)$ in the 3-D space given the depth $\tilde{z}$ of the point P acquired by the Kinect sensor. The vector $\vec{r}$ denotes the ray that is traced from the pixel $p(u,v)$ on the image plane to its corresponding 3-D point P. The trajectory of the ray can be formulated as $$\vec{r}=C+\lambda\vec{d} \quad\quad \text{Equation (1)}$$

where C(0,0,0) is the camera's center of the projection, which is also the origin of the coordinate system, $\vec{d}$ is a unit vector indicating the ray's direction, and $\lambda$ is the propagation factor.

Since P is on the trajectory of the ray $\vec{r}$, then:

$$P = C + \lambda_P \vec{d}. \quad \text{Equation (2)}$$

In a camera coordinate system, the direction vector $\vec{d}$ can be decomposed along the three major axes as $\vec{d}=(d_x,d_y,d_z)$, where the x and y directions determine the image plane and the z direction is the optical axis. Another point lying on the ray $\vec{r}$ is the pixel p(u,v), which is the intersection of the ray $\vec{r}$ and the image plane. Since the image plane is at z=1 in this case, it follows that:

$$(u,v,1) = (0,0,0) + \lambda_p(d_x, d_y, d_z). \quad \text{Equation (3)}$$

Therefore the ray's direction can be computed as $$(d_x, d_y, d_z) = \left( \frac{u}{\sqrt{u^2+v^2+1}}, \frac{v}{\sqrt{u^2+v^2+1}}, \frac{1}{\sqrt{u^2+v^2+1}} \right). \quad \text{Equation (4)}$$

For each pixel p(u,v) on the input image, there is a depth measurement from the depth image along the optical axis. Given the depth measurement $\tilde{z}$ of the 3-D point P corresponding to the pixel p(u,v), its propagation factor can be computed by Equation (2) as $$\lambda_P = \tilde{z}\sqrt{u^2+v^2+1}. \quad \text{Equation (5)}$$

Therefore, by substituting Equation (5) into Equation (2), the 3-D location of P can be computed as $(u\tilde{z}, v\tilde{z}, \tilde{z})$.

When this procedure is used for every input pixel in the depth image, a point cloud representation is obtained for the acquired face from a Kinect sensor. In order to have a better visualization of a 3-D face, or make any measurements from the face, a 3-D surface mesh can be reconstructed by applying the delaunay triangulation (see L. Guibas and J. Stolfi, "Primitives for the manipulation of general subdivisions and the computation of voronoi," ACM Transaction on Graphics, 4(2): 74-123, April 1985) (herein incorporated by reference) to the point cloud.

Figures 8A, 8B:
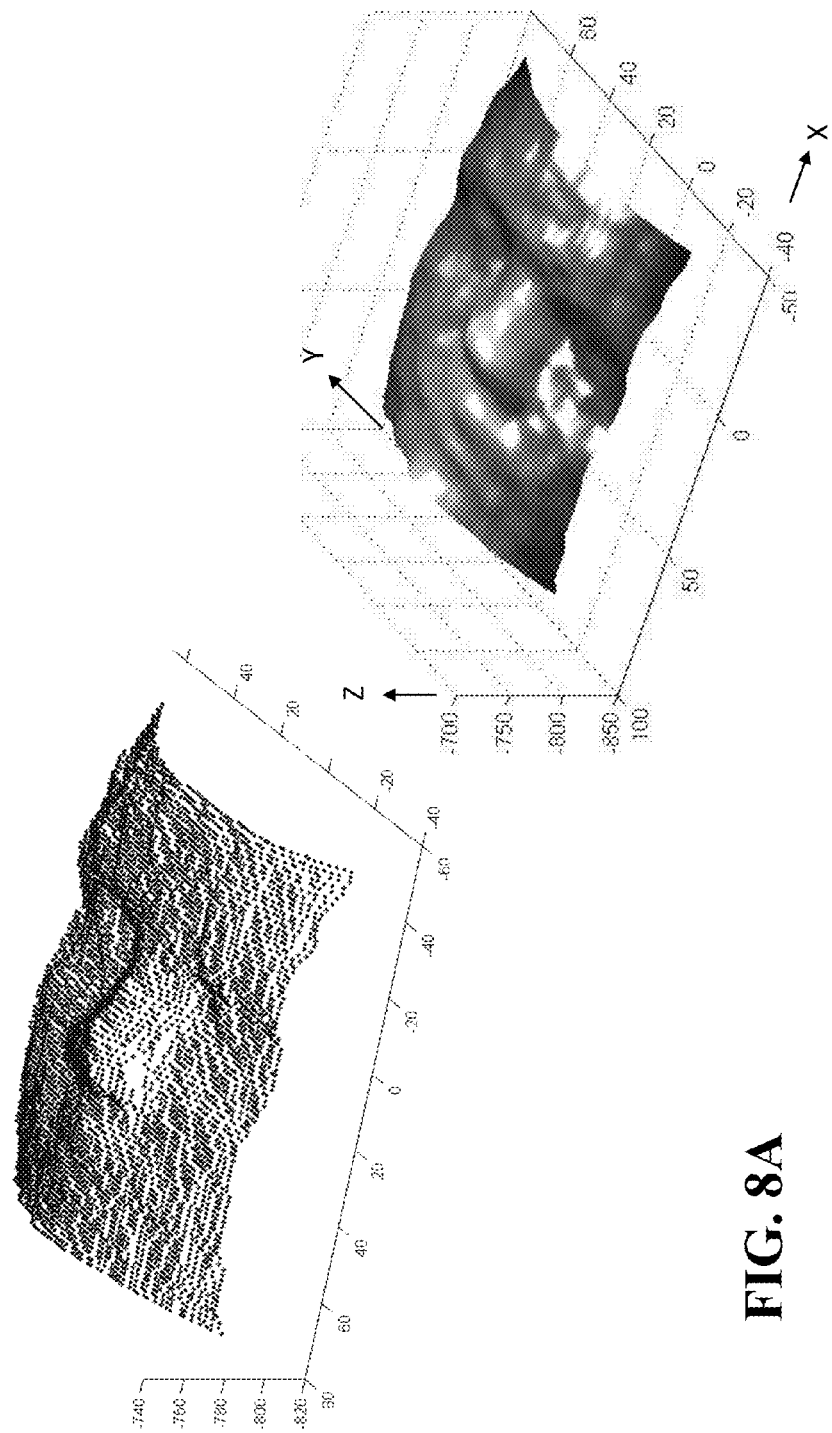
FIG. 8A shows a 3-D point cloud constructed using the depth map acquired by Kinect sensor via a ray tracing approach.
FIG. 8B schematically illustrates a "face mesh" constructed using FIG. 8A.

The point cloud or the 3-D surface mesh is referred to as a 3-D face pre-model. From the resultant 3-D face surface mesh (3-D face pre-model), the facial features are either manually annotated on the 3-D model or can be located using existing automatic 3-D face feature extraction methods. FIG. 8A schematically illustrates a reconstructed 3-D facial point cloud. FIG. 8B schematically illustrates a "face mesh." A Mesh is a collection of triangles that represents a surface or solid geometry. In a 3-D representation of a face, a set of points, called point cloud, is acquired. A triangle is formed using neighboring three points. A mesh is consisted of many these tiny triangles. A face mesh represents the surface of a face in 3-D using the mesh.

Figure 9A:
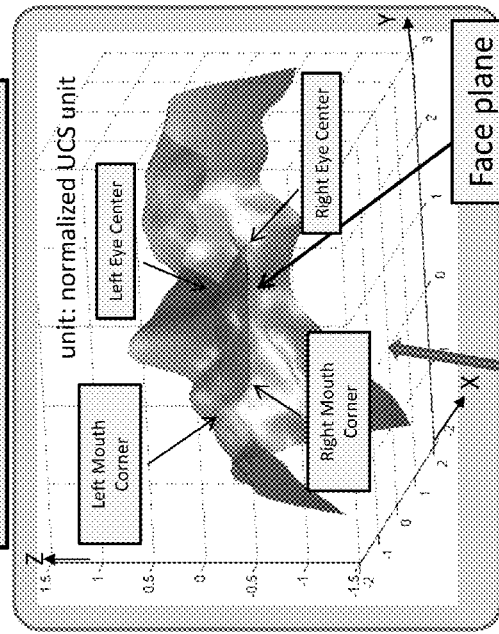
FIG. 9A is a schematic illustration of a face mesh in world coordinate in which the plane passing through these four points is not vertical with respect to the face direction.
Figure 9B:
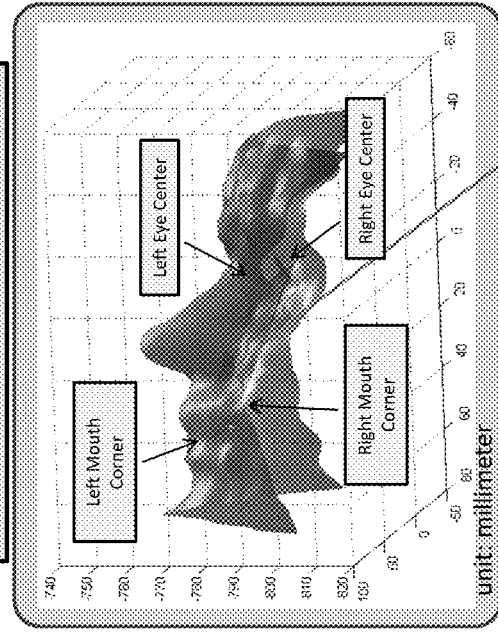
FIG. 9B is a schematic illustration of a face mesh in the UCS coordinate system in which a plane passing through the same four points (oriented horizontally) is labeled as "Face plane").

In accordance with the preferred embodiment, the face plane is a vertical plane that passes through four points (the centers of corners of each eye and the corners of mouth). FIG. 9A is an illustration of a face mesh in the world coordinate system in which the plane passing through these four points is not vertical with respect to the face direction. FIG. 9B is an illustration of a face mesh in the Unified Coordinate System (UCS) in which the plane passing through these four points is in the same vertical plane (shown as being horizontal in the image of FIG. 9B) with respect to the face direction. The plane is labeled as "face plane." The midpoints of the corners of each eyes and corners of the mouth are not labeled, however, the corners of the mouth are measured. The midpoint of the corners of each eye is calculated as the center of corners of eye, where the corners of eye are measured.

For each subject in the gallery, if the single pose input imagery is utilized, one depth image from one pose is acquired from one Kinect sensor and one 3-D face pre-model is reconstructed. If multiple pose input imagery is utilized, multiple depth images from multiple poses are acquired from multiple Kinect sensors and multiple 3-D face pre-models are reconstructed. Each 3-D face pre-model corresponds to one pose input acquisition. Similarly, the probe could contain one 3-D face pre-model for one subject or multiple 3-D face pre-models for one subject.

3-D Registered Face Model Reconstruction

Figure 10:
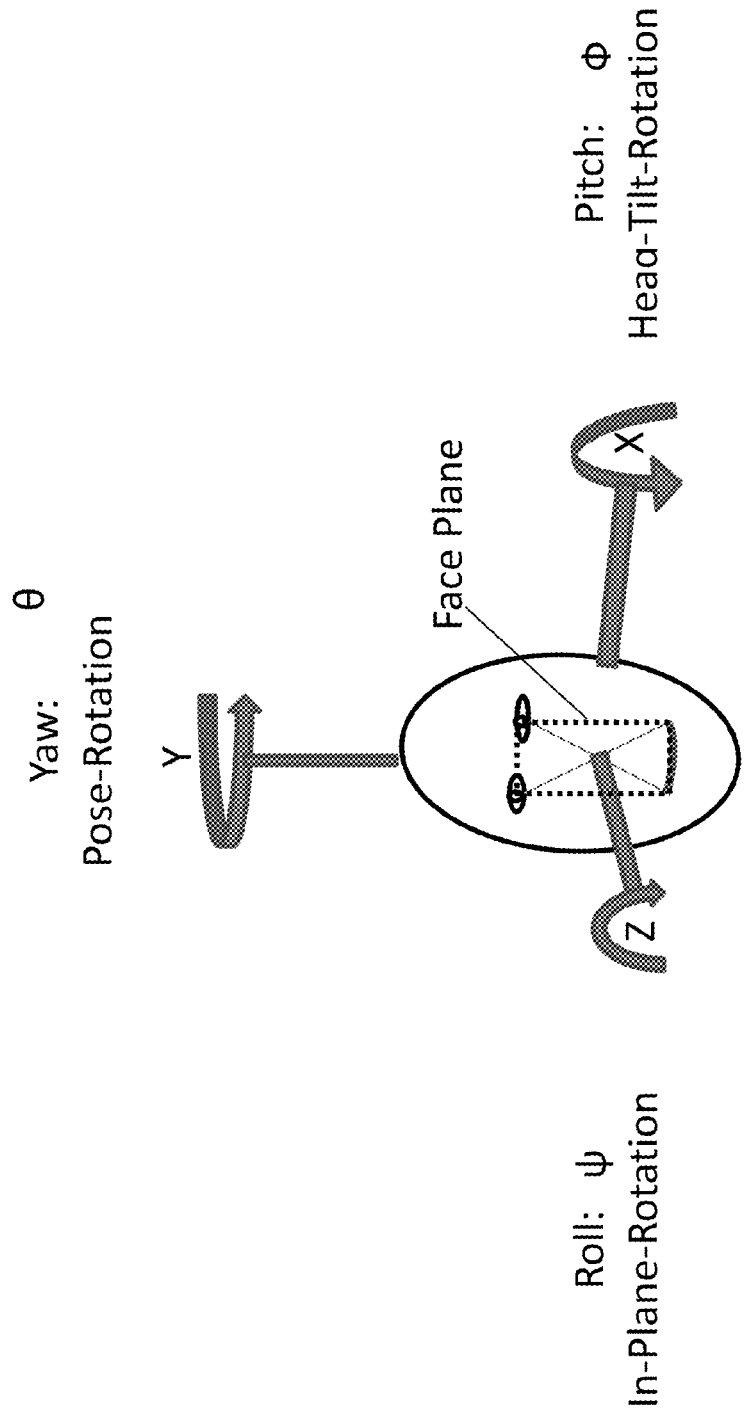
FIG. 10 is a schematic illustration depicting three types of rotations, i.e., in-plane, pose, and tilt rotations, which are commonly referred to as roll, jaw, and pitch.

When a 3-D face pre-model is acquired under an uncooperative (uncontrolled) condition, the 3-D face pre-model can contain three types of rotations, i.e., in-plane, pose, and tilt rotations as shown in FIG. 10, which are commonly referred to as roll, jaw, and pitch.

In order to match 3-D face pre-models that are taken by different sensors and at different times under uncooperative conditions, the face pre-models from the gallery and probe need to be transformed into a common coordinate system via the preferred embodiment 3-D registration method, into a coordinate system which may be referenced as the unified coordinate system. A preferred embodiment of the present invention utilizes a coordinate system that is invariant to the sensor position with respect to the human subject when the face image is taken; i.e., invariant relative to a pose of the human head.

The preferred embodiment also may utilize a novel method of a 3-D registration, which may be referred to as 3-D stereotactic registration. Although the word "stereotactic" may be used herein, the invention is not limited to stereotactic registration. The preferred embodiment 3-D registration method transforms the 3-D face pre-model into a unified coordinate system (UCS) to generate the 3-D registered face model. The transformation contains shifts, 3-D rotation, and scale, which is a generalized yaw, pitch, roll, scale, and shift transformation to a unified coordinate system (UCS).

Described in the following are a) the unified coordinate system (UCS); b) estimation of preferred embodiment transformation parameters using a single 3-D face pre-model; c) estimation of preferred embodiment transformation parameters using a single 3-D face pre-model with the iterative refinement; d) estimation of preferred embodiment transformation parameters using multiple 3-D face pre-models; and e) the integrated face model from multiple registered face models.

Unified Coordinate System (UCS)

When a human face in a three dimensional space is viewed from a side view, there is a difference in depth for the eyes and the mouth, which is unique for each person. Thus, for a human head in a "normal" position, which is normally termed as a frontal pose, the centers of corners of each eye and the corners of mouth are on two different vertical planes.

Figure 11:
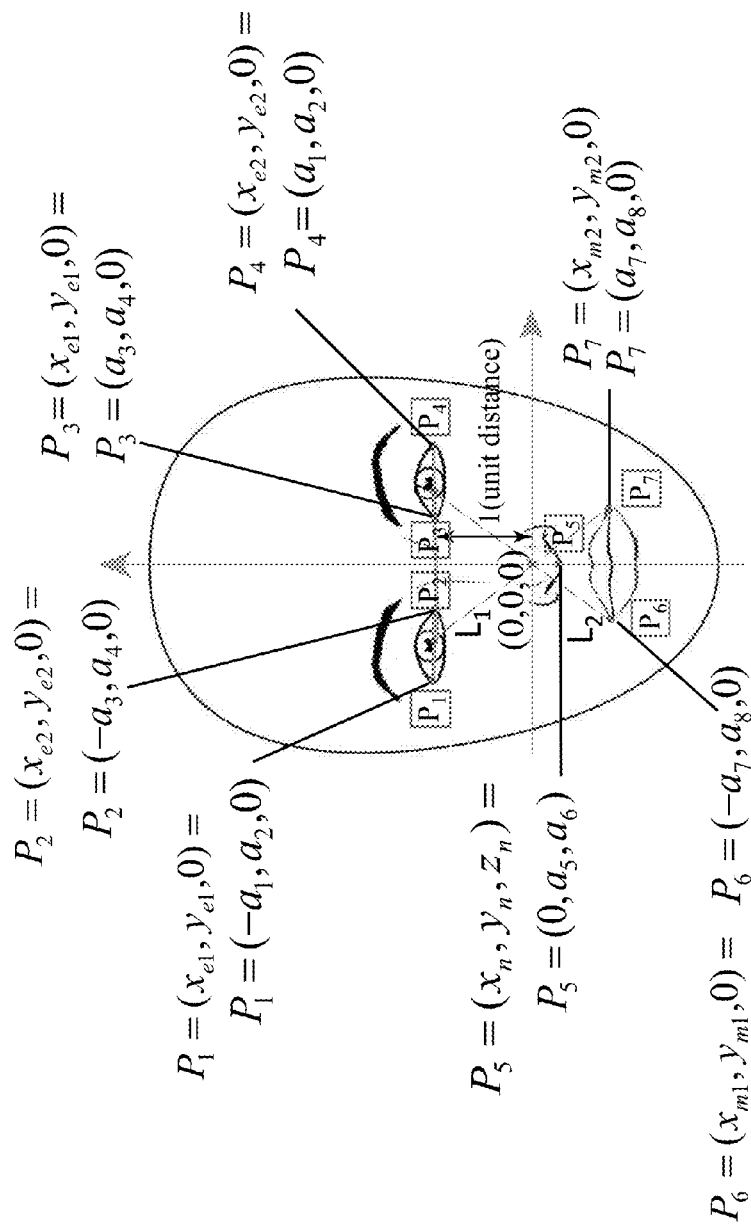
FIG. 11 is a schematic illustration showing the measurement points for the unified coordinate system (UCS), which may comprise, for example, four points on a human face, i.e., two midpoints of the corners of each eye and two corners of mouth and located in a plane ("face plane") that passes through these four points (shown by the crossing lines).
Figure 12:
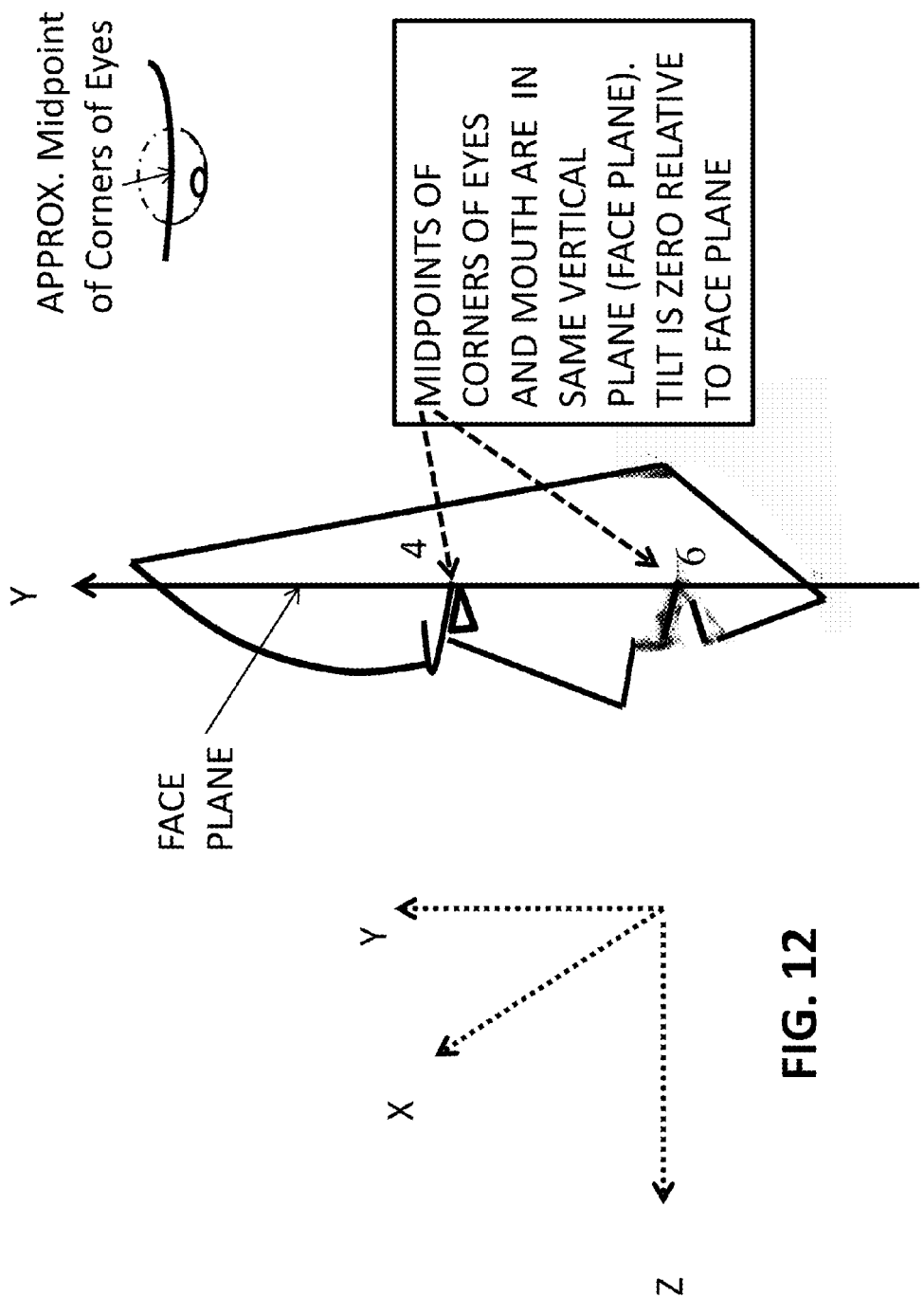
FIG. 12 is a schematic illustration depicting a side view of a head tilted to a vertical face plane. Also shown in FIG. 12 (upper right portion) is a schematic representation of an eye ball depicting the midpoints of the corners of an eye.

A preferred embodiment utilizes a unified coordinate system (UCS) defined by first labeling four points on a human face, two midpoints of the corners of each eye and two corners of mouth, as labeled in FIG. 11. The unified coordinate system (UCS) of a preferred embodiment of the present invention is defined in the vertical plane that passes through these four points, as shown in FIGS. 11 and 12, which may require the human head to be tilted from the normal frontal pose to a plane referred to herein as the "face plane." Illustrated in FIG. 12 is a side view of a head tilted to the vertical face plane. Also shown in FIG. 12 (upper right portion) is a schematic representation of an eye ball showing the midpoints of the corners of an eye. A preferred embodiment of the present invention may use a line that passes through the midpoints of the corners of the eyes since in a 3-dimensional space, two corners of the eye might be in different heights. If the corners of eye are connected by a line, the midpoint of corners of that eye is the center of that line segment. By using the midpoints of the corners of eyes, some measurement errors can be reduced. In the alternative, the two outer corners of eyes and corners of mouth could be used to form the face plane, or two inner corners of eyes and corners of mouth could be used to form the face plane. However, using midpoints of corners of eyes and corners of mouth could reduce some measurement errors.

This face plane is distinguishable from a face plane described in U.S. Pat. No. 7,221,809 ('809 Geng patent), entitled "Face recognition system and method," May 22, 2007, by Z. J. Geng, herein incorporated by reference. The '809 Geng patent defined "face plane" differently in that Geng's face plane was not defined as being vertical, but simply as passing through the centers of two eyes and outer corners of mouth, with the location of the nose tip being on the central bi-section plane of the face plan, and the projection of the nose tip towards the face plane forming a "Nose Vector."

The four points defined using the preferred embodiment Unified Coordinate System (UCS) (for example, midpoints of the corners of the eyes and corners of the mouth) uniquely define each person according to the coordinates of the sensor with respect to the relative pose of the head. In accordance with a preferred embodiment of the present invention, a face pre-model is transformed from some undefined position into the unified coordinate system (UCS) to generate a registered face model. Then the face recognition or face matching can then be performed under the unified coordinate system on the registered face models.

As stated above, a face plane may be defined as a plane passing through four points (the centers of corners of each eye and the corners of mouth) that is vertical. For a normal posed human head in a frontal pose, the centers of corners of each eye and the corners of mouth are on two different vertical planes. In order to have these four points passing a vertical plane, the human head is tilted from the normal frontal pose; referred to as the face plane as depicted in FIG. 12. In accordance with a preferred methodology of the present invention, in order to compare a test face image with a gallery of multiple face images, especially when all the face images do not have the same 3-D orientation angles, the facial image is transformed into a face plane using a 3-D registration algorithm of a preferred embodiment. Then, a test face image may be compared with each face image in the gallery containing images in the face plane coordinate system, referred to herein as the unified coordinate system. The face plane is considered as a "reference" or base coordinate system in which the face images can be compared. Facial expressions (e.g., smiling or frowning) are not considered; as an assumption is made that the facial image of a person has a neutral expression. For a given image or 3-D representation of a person's head, the preferred embodiment calculates the transformation parameters to bring the image of person's head to the face plane coordinate system.

Since the transformation parameters that the algorithm calculates include three orientation angles that bring the face image into the face plane position, one can say that if three orientation angles that the algorithm calculates are zeros, the person's head is in the face plane position. If someone is posing, the person capturing the image need not measure whether "two midpoints of the corners of each eye and two corners of mouth" are in the same vertical plane. Again, after transforming the face image into its face plane position using a preferred embodiment of the present invention, if three orientation angles are zeros, then the "two midpoints of the corners of each eye and two corners of mouth" are in the same vertical plane. The person's head can be in any position when the image is taken and a preferred embodiment of the present invention can determine if this person matches one of the persons in the gallery by comparing them in the face plane coordinate system.

Since face pre-models at any other positions with possible three rotation angles are transformed into the unified coordinate system (UCS) using a preferred embodiment of the present invention, the face recognition problem with un-cooperative or uncontrolled conditions where face pre-models have 3-D rotational angles may need additional treatment. An uncooperative or random subject for face recognition may be based on one single 3-D face pre-model that is obtained from one Kinect sensor or multiple 3-D face pre-models that are obtained from multiple Kinect sensors. Recognition and registration is achieved by performing the generalized yaw, pitch, roll, scale, and shift transformation to a unified coordinate system (UCS).

Shift is related to the relative position of the object to the center of the image plane. Scale is related to the object range and sensor focal plane properties (number of pixels, element spacing, etc.) Yaw, pitch, and roll are related to the pose rotation, head tilt rotation and in-plane rotation.

Estimation of Transformation Parameters Using Single 3-D Face Pre-Model

A face plane under the unified coordinate system (UCS) is illustrated in FIGS. 11 and 12, which illustrate the eye corners and mouth corners being in the same vertical plane where z=0. Optionally, 7 primary points, or landmarks, may be used to describe a face from a 3-D face pre-model, i.e., the outer corners of two eyes, inner corners of two eyes, corners of mouth and the nose tip.

The origin point 0 (0,0,0) of the face plane is defined as the intersection of two lines as shown in FIG. 11. One diagonal line $L_1$ connects the center of two corners of left eye and the right corner of mouth. Another diagonal line $L_2$ connects the center of two corners of right eye and the left corner of mouth. The vertical distance between the eye centers and the origin is referred to as a unit distance.

As depicted in FIG. 11, the UCS coordinates of the seven landmark points are: left eye outer corner: $p_1=(x_{e1},y_{e1},0)$, left eye inner corner: $p_2=(x_{e2},y_{e2},0)$, right eye inner corner: $p_3=(x_{e3},y_{e3},0)$; right eye outer corner: $p_4=(x_{e4},y_{e4},0)$ nose tip: $p_5=(x_n,y_n,z_n)$; mouth left corner: $P_6=(x_{m1},y_{m1},0)$, and mouth right corner: $p_7=(x_{m2},y_{m2},0)$. By applying the symmetric property of a 3-D face model, the relation of the seven coordinates are defined as Equation list (7):

$$-x_{e1}=x_{e4}=a_1, y_{e1}=y_{e4}=a_2, -x_{e2}=x_{e3}=a_3, y_{e2}=y_{e3}=a_4,$$
$$x_n=0, y_n=a_5, z_n=a_6, -x_{m1}=x_{m2}=a_7, y_{m1}=y_{m2}=a_8$$

The seven landmark coordinates with respect to the primary parameters may be defined as (Equation list (8)):

left eye outer corner: $p_1=(-a_1,a_2,0)$, left eye inner corner: $p_2=(-a_3,a_4,0)$, right eye inner corner: $p_3=(a_3,a_4,0)$, right eye outer corner: $p_4=(a_1,a_2,0)$ nose tip: $p_5=(0,a_5,a_6)$, mouth left corner: $p_6=(-a_7,a_8,0)$, mouth right corner: $p_7=(a_7,a_8,0)$.

In accordance with the principles of the present invention, each landmark point on a 3-D face pre-model can be transformed to the UCS domain by the following transformation:

$$P_M = q \cdot R \cdot P_U \qquad \text{Equation (9)}$$

where $P_M=[u,v,r]^T$ represents the coordinates of a point in the 3-D face pre-model, and denoted a point in the measurement domain; $P_U=[x,y,z]^T$ represents the coordinates of a point on the corresponding registered 3-D face model in the UCS domain; q is the scaling factor to normalize faces of different sizes; and R is the rotation matrix. As illustrated in FIG. 10, R can be further decomposed in terms of yaw, pitch, and roll as $$R = \Theta \cdot \Phi \cdot \Psi \qquad \text{Equation (10)}$$

where $\Theta$ represents the in-plane rotation transformation (roll) in the (x,y) plane, that is, $$\Theta = \begin{bmatrix} \cos\theta & \sin\theta & 0 \\ -\sin\theta & \cos\theta & 0 \\ 0 & 0 & 1 \end{bmatrix}, \qquad \text{Equation (11)}$$

$\Phi$ represents the pose-rotation transformation (yaw) in the (x,z) plane, that is, $$\Phi = \begin{bmatrix} \cos\phi & 0 & \sin\phi \\ 0 & 1 & 0 \\ -\sin\phi & 0 & \cos\phi \end{bmatrix}, \qquad \text{Equation (12)}$$

$\Psi$ represents the tilt-rotation transformation (pitch) in the (y,z) plane, that is, $$\Psi = \begin{bmatrix} 1 & 0 & 0 \\ 0 & \cos\psi & \sin\psi \\ 0 & -\sin\psi & \cos\psi \end{bmatrix}, \qquad \text{Equation (13)}$$

where $\theta$, $\Phi$, and $\psi$ are the angles of in-plane, pose, and tilt rotations, respectively.

In order to estimate the transformation that transforms a 3-D face pre-model into the UCS, 12 parameters need to be estimated that is, $(a_1,a_2,a_3,a_4,a_5,a_6,a_7,a_8,\theta,\varphi,\psi,q)$. These parameters can be normalized by the scale q that is derived from the unit distance defined above. Therefore, 11 transformation parameters need to be estimated.

A parameter vector can be defined as:

$$V_P = (a_1,a_2,a_3,a_4,a_5,a_6,a_7,a_8,\theta,\varphi,\psi)^T \qquad \text{Equation (14)}$$

The coordinates of each landmark in a 3-D face pre-model can be represented by this parameter vector, $V_p$, as shown in Equation (9). The coordinates of each face landmark can also be obtained by measurements from the face pre-model, which is denoted as $\overline{P}_M=[\overline{u},\overline{v},\overline{r}]^T$.

For a 3-D face pre-model, 7 landmarks are obtained in the measurement domain which results 7 sets of (u,v,r) values. Therefore, 21 equations are formed from Equation (9) to estimate 11 parameters in Equation (14). The goal is to make the difference between the measurement coordinates and the estimated coordinates of face landmarks minimal, that is, $$\min|\overline{P}_M - P_M|. \qquad \text{Equation (15)}$$

The function F, which is the function of the parameter vector $V_p$, can be defined as $$F = f(V_p) \qquad \text{Equation (16)}$$

where $$F = (F_1, \ldots, F_{21})^T$$

$$f(V_p) = (f_1(V_p), \ldots, f_{21}(V_p))^T$$

$$F_k = \begin{cases} F_{3n-2} = \overline{u} \\ F_{3n-1} = \overline{v}, \quad n=1,\ldots,7 \\ F_{3n} = \overline{r} \end{cases}$$

$$f_k(V_p) = \begin{cases} f_{3n-2}(V_p) = u \\ f_{3n-1}(V_p) = v, \quad n=1,\ldots,7 \\ f_{3n}(V_p) = r \end{cases}$$

where (u,v,r) is calculated from Equation (9) using the parameter vector $V_p$, n=1, ..., 7 represent 7 landmarks, and k=1, ..., 21 represent 21 equations that are resulted from 7 landmark measurements. The measurements $(\overline{u},\overline{v},\overline{r})$ may be obtained from the inquiring face pre-model by a user mouse interface or by using any of the facial landmark detection algorithms.

A primary goal is to find an estimate of $V_p$, denoted as $\tilde{V}_p$. This estimate minimizes $$|F - f(\tilde{V}_p)|. \qquad \text{Equation (17)}$$

To estimate eleven parameters $V_p=(a_1,a_2,a_3,a_4,a_5,a_6,a_7,a_8,\theta,\varphi,\psi)^T$, a non-linear least square algorithm, such as the Gaussian least square differential correction (GLSDC) can be applied. The function F can be approximated by $$\Delta F \approx \left(\frac{\partial f}{\partial V_p}\right) \Delta V_p. \qquad \text{Equation (18)}$$

If $\Delta F$ is given, then one can find $\Delta V_p$ as follows:

$$\Delta V_p = \left[\left(\frac{\partial f}{\partial V_p}\right)^T \left(\frac{\partial f}{\partial V_p}\right)\right]^{-1} \left(\frac{\partial f}{\partial V_p}\right)^T \Delta F. \qquad \text{Equation (19)}$$

Figure 13:
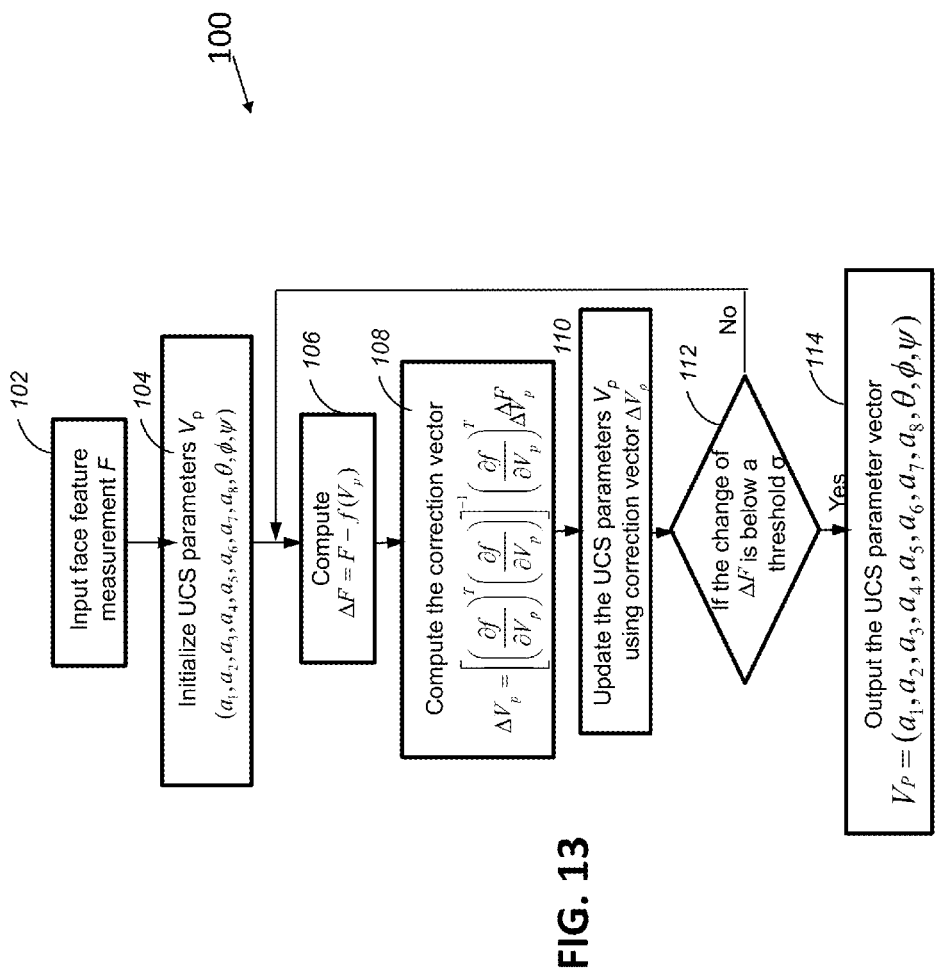
FIG. 13 is a schematic illustration of a procedure for estimating the transformation parameters using an algorithm comprising the inputting of the parameter vector starting estimates and calculating the estimate correction vector using Equation (19).

Next, the estimation is updated using $V_p = V_p + \Delta V_p$. The algorithm can be summarized as follows as shown in FIG. 13:

Step (1) Input measurements F (Box 102).
Step (2) Input parameter vector starting estimates (Box 104)

$$V_p = (a_1,a_2,a_3,a_4,a_5,a_6,a_7,a_8,\theta,\varphi,\psi)^T$$

Step (3) Calculate $\Delta F = F - f(V_p)$ (Box 106).
Step (4) Calculate the estimate correction vector $\Delta V_p$ using Equation (19) (Box 108).
Step (5) Update the parameter vector $V_p = V_p + \Delta V_p$ (Box 110).

Step (6) Stop iteration if ΔF does not change significantly from one iteration to another (Box 112), otherwise go to step (3).

Step (7) Output the estimated transformation parameters V$_p$ (Box 114).

Estimation of Preferred Embodiment Transformation Parameters Using a Single 3-D Face Pre-Model with the Iterative Refinement To improve the accuracy of the estimation, the transformation parameters are separated into two groups: the face plane parameters $P_f = (a_1, a_2, a_3, a_4, a_5, a_6, a_7, a_8)^T$ and the rotation parameters $P_r = (\theta, \Phi, \psi)^T$. In two steps they may be iteratively refined. In this case, the objective function of the optimization problem becomes:

$$\arg\min_{P_f, P_r} \|F - R(P_r) \cdot M \cdot P_f\|_2 \qquad \text{Equation (20)}$$

where $R(P_r)$ corresponds to the combined rotational transformation (in-plane, pose and tilt). According to Equation (10), $R(P_r)$ can be written as (Equation (21)):

$$R(P_r) = \Theta(\theta)\Phi(\phi)\Psi(\psi) = \begin{bmatrix} \cos(\theta) & \sin(\theta) & 0 \\ -\sin(\theta) & \cos(\theta) & 0 \\ 0 & 0 & 1 \end{bmatrix} \cdot \begin{bmatrix} \cos(\phi) & 0 & \sin(\phi) \\ 0 & 1 & 0 \\ -\sin(\phi) & 0 & \cos(\phi) \end{bmatrix} \cdot \begin{bmatrix} 1 & 0 & 0 \\ 0 & \cos(\psi) & \sin(\psi) \\ 0 & -\sin(\psi) & \cos(\psi) \end{bmatrix}$$

M is the transformation matrix that maps the parameters $P_f$ (8 by 1 column vector) to $P_u$ (1 by 3 row vector):

$$P_u = M \cdot p_f. \qquad \text{Equation (22)}$$

The transformation is performed according to the landmark coordinate as shown in Equation (8). Each landmark has a unique transformation matrix M.

Figure 14:
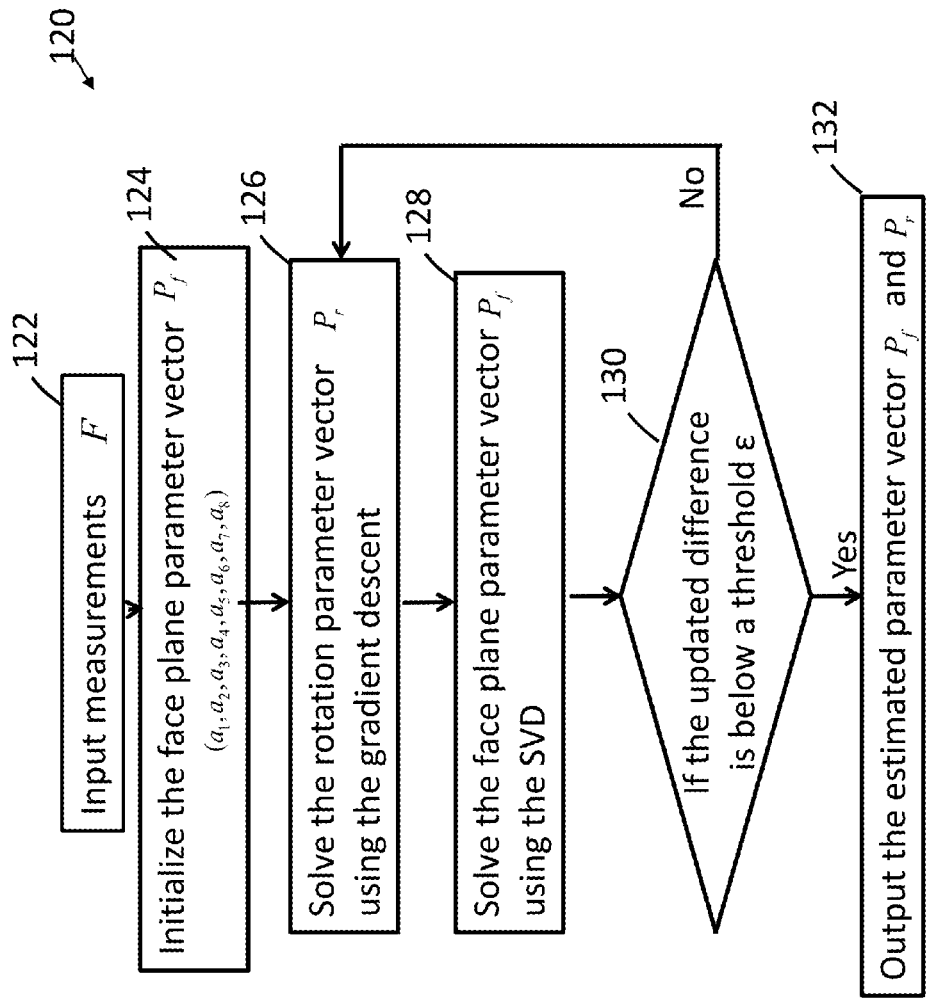
FIG. 14 is a schematic illustration depicting the transformation that transforms a 3-D face pre-model into the UCS domain with the iterative refinement.

A technique that iteratively refines face plane parameters $P_f$ and rotation parameters $P_r$ is described in FIG. 14. In Box 122 the measurements are inputted and in Box 124 the face plane parameter vector is initialized. Next, the rotation parameter vector may be solved.

1) θ, φ, ψ Sub-Problem (Box 126—Solving)

The face plane parameters $P_f$ are initialized using the aligned mean face and applied as known parameters to solve $P_r = (\theta, \varphi, \psi)^T$ by the gradient descent optimization. Since the unknown parameters are reduced to $P_r$ only, our objective function becomes:

$$\arg\min_{P_r} \|F - R(P_r) \cdot M \cdot P_f\|_2, \qquad \text{Equation (23)}$$

$$\text{s.t.} |\theta, \phi, \psi| < \frac{\pi}{2}.$$

Next, $G(\theta, \varphi, \psi)$ is defined as:

$$G(\theta, \varphi, \psi) = F - R(P_r) \cdot M \cdot P_f = F - \Theta(\theta)\Phi(\varphi)\Psi(\psi) \cdot M \cdot P_f,$$

A goal is to find optimal solutions for $(\theta, \varphi, \psi)$ that results in the minimum value of G.

One approach to solve this optimization is by using an exhaustive search, which computes G for all possible values of $\theta, \varphi, \psi$ and returns the combination that produces the smallest G as the solution. However, this approach has very low efficiency since the search space is of $O(n^3)$.

Instead of conducting an exhaustive search, a gradient descent method is used to solve the optimization problem. Gradient descent is based on the observation that the multivariable function G is differentiable in a neighborhood of an arbitrary point $(\theta, \varphi, \psi)$. Therefore, G decreases fastest if one goes from $(\theta, \varphi, \psi)$ in the direction of the negative gradient of G at $(\theta, \varphi, \psi)$. It is assumed that $(\theta^k, \varphi^k, \psi^k)$ is determined at the $k^{th}$ iteration, then $(\theta^{k+1}, \varphi^{k+1}, \psi^{k+1})$ is updated for the next iteration k+1 as:

$$(\theta^{k+1}, \varphi^{k+1}, \psi^{k+1}) = (\theta^k, \varphi^k, \psi^k) - \gamma \cdot \nabla H(\theta^k, \varphi^k, \psi^k) \qquad \text{Equation (24)}$$

where $$H(\theta, \phi, \psi) = \frac{1}{2} G^T(\theta, \phi, \psi) G(\theta, \phi, \psi)$$

and γ is a parameter that controls the step of updating. In experiments, γ=0.01 was chosen. The gradient of $H(\theta^k, \varphi^k, \psi^k)$, $\nabla H(\theta^k, \varphi^k, \psi^k)$, can be computed as:

$$\nabla H(\theta^k, \varphi^k, \psi^k) = J_G(\theta^k, \varphi^k, \psi^k) G(\theta^k, \varphi^k, \psi^k)$$

where $J_G$ is the Jacobian matrix of G:

$$J_G(\theta, \phi, \psi) = \begin{bmatrix} \frac{\partial G_1}{\partial \theta} & \frac{\partial G_1}{\partial \phi} & \frac{\partial G_1}{\partial \psi} \\ \frac{\partial G_2}{\partial \theta} & \frac{\partial G_2}{\partial \phi} & \frac{\partial G_2}{\partial \psi} \\ \vdots & \ddots & \vdots \\ \vdots & \ddots & \vdots \\ \frac{\partial G_7}{\partial \theta} & \frac{\partial G_7}{\partial \phi} & \frac{\partial G_7}{\partial \psi} \end{bmatrix} \qquad \text{Equation (25)}$$

$G_{1, \ldots, 7}$ are the objective functions for each landmark point.

If γ is small enough, than $G(\theta^{k+1}, \varphi^{k+1}, \psi^{k+1}) < G(\theta^k, \varphi^k, \psi^k)$. The iteration is stopped when the difference between the updated result and the previous result is below some pre-defined threshold $\epsilon(\epsilon > 0)$, i.e., stop at the $k^{th}$ iteration if $|G(\theta^{k+1}, \varphi^{k+1}, \psi^{k+1}) - G(\theta^k, \varphi^k, \psi^k)| \leq \epsilon$.

2) $P_f$ Sub-Problem (Box 128)

Once the rotation parameters $P_r = (\theta, \varphi, \psi)^T$ are obtained, they are used as known parameters to solve for the face plane parameters, $P_f = (a_1, a_2, a_3, a_4, a_5, a_6, a_7, a_8)^T$. In this sub-problem, an objective function becomes:

$$\arg\min_{P_f} \|F - R \cdot M \cdot P_f\|_2, \qquad \text{Equation (26)}$$

$$\text{s.t.} a_{1,\ldots,8} > 0, (a_2 + a_4)/2 = 1.$$

Since the objective function has eight variables, solving the optimization problem using the gradient descent method would need to compute a Jacobian matrix with dimension 7 by 8, which is computationally expensive. To reduce computation time, the problem is formulated into a large linear system:

$$F = R \cdot M \cdot P_f. \qquad \text{Equation (27)}$$

This linear system is solved using the least square optimization. Let $A = R \cdot M$. Since A is not a square matrix (3 by 8), the pseudo-inverse of A is computed using the singular value decomposition (SVD):

$$A^{-1} = V \cdot S \cdot U^T \qquad \text{Equation (28)}$$

where V and U are orthogonal, so that their inverses are equal to their transposes, S is a diagonal matrix composed of singular values of A (square roots of the eigenvalues of $A^H A$), i.e., $S=[\text{diag}(\sigma_1^{-1}, \sigma_2^{-1}, \ldots, \sigma_n^{-1})]$. When $|\sigma_i|$ is very close to 0, one can replace $\sigma_i^{-1}$ with 0 to reduce round-off error. Therefore, the solution of Equation (26) can be computed as:

$$P_f = V \cdot [\text{diag}(\sigma_1^{-1}, \sigma_2^{-1}, \ldots, \sigma_n^{-1})] \cdot (U^T F). \qquad \text{Equation (29)}$$

In summary, the transformation that transforms a 3-D face pre-model into the UCS domain with the iterative refinement is summarized in the following as shown in FIG. 14:

Step (1) Input measurements F (Box 122).
Step (2) Initialize the face plane parameters (Box 124):

$$P_f = (a_1, a_2, a_3, a_4, a_5, a_6, a_7, a_8)^T.$$

Step (3) Use $P_f$ as known parameters and solve the rotation parameters $P_r = (\theta, \varphi, \psi)^T$ by the gradient descent method (Box 126):

$$(\theta^{k+1}, \varphi^{k+1}, \psi^{k+1}) = (\theta^k, \varphi^k, \psi^k) - \gamma \cdot J_G(\theta^k, \varphi^k, \psi^k)$$
$$G(\theta^k, \varphi^k, \psi^k).$$

Step (4) Use $P_r$ as known parameters and solve the face plane parameters $P_f$ by the SVD (Box 128):

$$P_f = V \cdot [\text{diag}(\sigma_1^{-1}, \sigma_2^{-1}, \ldots, \sigma_n^{-1})] \cdot (U^T F).$$

Step (5) Stop the iteration until the difference between the updated result and the previous result is below some predefined threshold $\epsilon (\epsilon > 0)$ (Box 130), otherwise go to Step 3).
Step (6) Output the parameters $P_r$ and $P_f$ (Box 132).

Example

FIGS. 9A and 9B show an example of a face pre-model in the world coordinate and the registered face model in the UCS coordinate. It can be seen that the registered face plane becomes the vertical plane (although shown horizontally in FIG. 9B) and is aligned with the x-y plane after the registration using the preferred embodiment.

Estimation of Preferred Embodiment Transformation Parameters Using Multiple 3-D Face Pre-Models Note that the above algorithms require the input to be a complete set of seven landmark points, otherwise the problem is under-determined, i.e., the face parameter vector in the UCS domain cannot be solved. However, in real experiments, partial landmarks could occur due to occlusion caused by large pose changes or missing depth data. To solve the problem of having partial landmarks, multiple face pre-models are utilized that are acquired from a multiple Kinect sensor system as input whose landmark points are complementary. Illustrated in FIG. 5 are three Kinect sensors simultaneously capturing the same target with different poses in the preferred embodiment creation of the multiple Kinect sensor system; with up to three face pre-models as input. In addition, since the multiple input face pre-models correspond to the same UCS face parameter vector, they impose stronger constraints on $P_f$. Thus the estimation is more accurate than the single face model approach.

Due to the annotation error and incomplete depth data, the location or depth information of a landmark point can sometimes be inaccurate. To eliminate inaccurate landmark points, an interactive user interface can be implemented to allow the user to select desirable landmark points that are most suitable for the transformation parameter estimation to improve accuracy.

Figure 15:
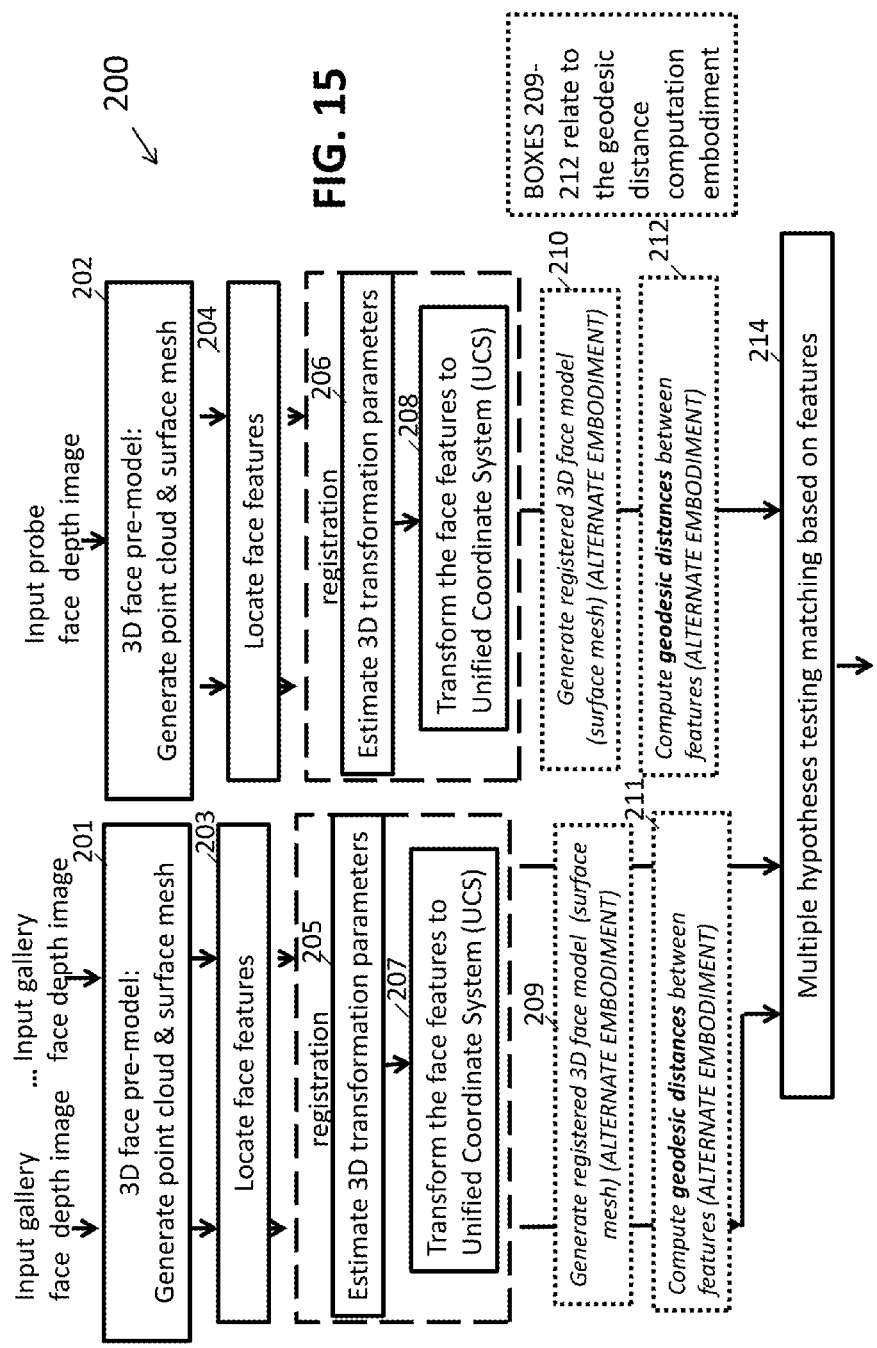
FIG. 15 is a schematic illustration showing a diagram of a preferred methodology of the present invention using a single 3-D face pre-model.

FIG. 15 is a diagram of a preferred methodology of the present invention using single 3-D face pre-models. Although shown side-by-side, the procedures in the boxes are not necessary executed at the same time. In Box 201 point cloud & surface mesh models are generated for inputted gallery images. In Box 202 point cloud & surface mesh models are generated for inputted probe image. Facial features are located for the gallery images and probe image in Boxes 203 and 204, respectively. Boxes 205 and 207 relate to registration of the gallery image data in which 3-D transformation parameters are estimated (Box 207) and the facial features are transformed into the unified coordinate system (Box 209). Similarly, in Box 206 3-D transformation parameters are estimated for the probe image and the facial features are transformed into the unified coordinate system in Box 208. Based upon the results of Boxes 207 and 208, matching between the probe and gallery image data may be conducted as shown in Box 214. An alternative procedure is depicted in Boxes 209-212, which relate to the geodesic distance computation alternate preferred embodiment. In Box 209 (alternate preferred embodiment) registered 3-D face model (surface mesh) is generated for each galley image data and in Box 211 the geodesic distances between features are calculated. In Box 210 (alternate preferred embodiment) registered 3-D face model (surface mesh) is generated for the probe image data and (optionally) in Box 212 the geodesic distances between features are calculated for the probe data.

Figure 16:
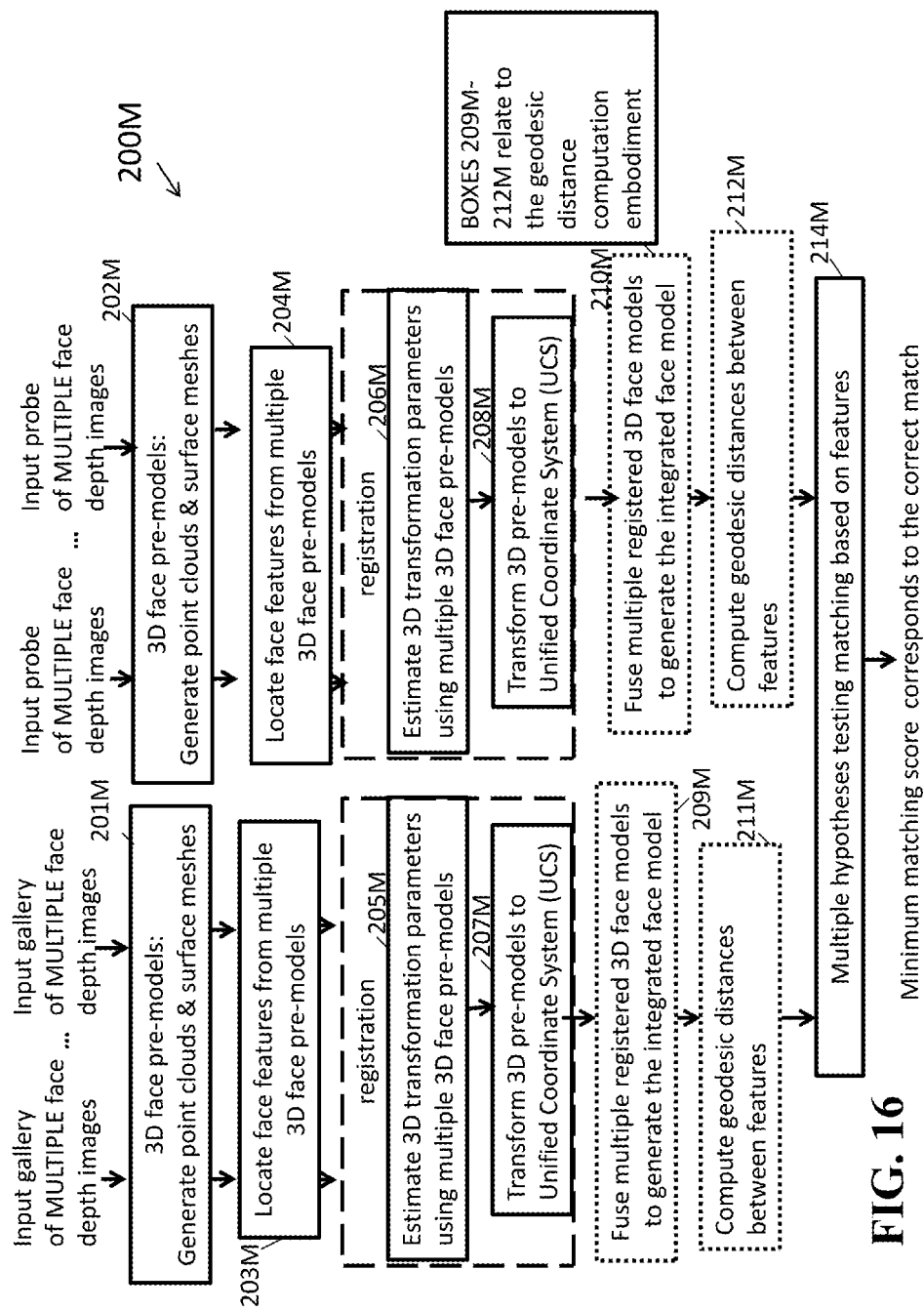
FIG. 16 is a schematic illustration showing a diagram of an alternate preferred methodology of the present invention using multiple 3-D face pre-models.

FIG. 16 is a diagram of a preferred methodology of the present invention using multiple 3-D face pre-models. Although shown side-by-side, the procedures in the boxes are not necessary executed at the same time. In Box 201M point cloud & surface mesh models are generated for multiple inputted gallery images. In Box 202M point cloud & surface mesh models are generated for the plurality of inputted probe images. Facial features are located for the gallery images and multiple probe images in Boxes 203M and 204M, respectively. Boxes 205M and 207M relate to registration of the gallery image data in which 3-D transformation parameters are estimated (Box 207M) and the facial features are transformed into the unified coordinate system (Box 209M). Similarly, in Box 206M 3-D transformation parameters are estimated for the multiple probe images and the facial features are transformed into the unified coordinate system in Box 208M. Based upon the results of Boxes 207M and 208M, matching between the probe and gallery image data may be conducted as shown in Box 214M. An alternative procedure is depicted in Boxes 209M-212M, which relate to the geodesic distance computation alternate preferred embodiment. In Box 209M (alternate preferred embodiment) integrated (registered and fused) 3-D face model (surface mesh) is generated for each galley image data and in Box 211M the geodesic distances between features are calculated. In Box 210M (alternate preferred embodiment) integrated (registered and fused) 3-D face model (surface mesh) is generated for the probe image data and (optionally) in Box 212M the geodesic distances between features are calculated for the probe data.

As shown in FIG. 16, as a further option of a preferred embodiment, the transformation parameters may be estimated using multiple face pre-models. Assume there are three sets of face landmark measurements $\{F^i\}$, i=1, 2, 3 as input. Since the three sets of input landmark points correspond to the same person, one needs to solve one set of the face plane parameters $P_f$ as well as three groups of rotation parameters $\{P_r^i\}$, i=1, 2, 3. Similar to the single face model approach, optimal solutions of $P_f$ and $\{P_r^i\}$, i=1, 2, 3, are sought that minimize the difference between the estimations and measurements. Therefore, the objective function is $$\arg\min_{P_f,\{P_r^i\}} \left\| \sum_{i=1}^{3}(F^i - R(P_r^i)\cdot M\cdot P_f) \right\|_2.$$ Equation (30)

Similar to the iterative refinement approach described in the previous section, an iterative refinement approach is used to estimate $P_f$ and $\{P_r^i\}$, where $\{P_r^i\}=\{\theta^i,\varphi^i,\psi^i\}$, i=1, 2, 3. The Jacobian matrix in the $\theta,\varphi,\psi$ sub-problem becomes $$J_G(\theta^1, \phi^1, \psi^1, \theta^2, \phi^2, \psi^2, \theta^3, \phi^3, \psi^3) = \begin{bmatrix} \frac{\partial G_1}{\partial \theta^1} & \frac{\partial G_1}{\partial \phi^1} & \frac{\partial G_1}{\partial \psi^1} & \frac{\partial G_1}{\partial \theta^2} & \frac{\partial G_1}{\partial \phi^2} & \frac{\partial G_1}{\partial \psi^2} & \frac{\partial G_1}{\partial \theta^3} & \frac{\partial G_1}{\partial \phi^3} & \frac{\partial G_1}{\partial \psi^3} \\ \frac{\partial G_2}{\partial \theta^1} & \frac{\partial G_2}{\partial \phi^1} & \frac{\partial G_2}{\partial \psi^1} & \frac{\partial G_2}{\partial \theta^2} & \frac{\partial G_2}{\partial \phi^2} & \frac{\partial G_2}{\partial \psi^2} & \frac{\partial G_2}{\partial \theta^3} & \frac{\partial G_2}{\partial \phi^3} & \frac{\partial G_2}{\partial \psi^3} \\ \vdots & \ddots & \ddots & \ddots & \ddots & \ddots & \ddots & \ddots & \vdots \\ \vdots & \ddots & \ddots & \ddots & \ddots & \ddots & \ddots & \ddots & \vdots \\ \frac{\partial G_7}{\partial \theta^1} & \frac{\partial G_7}{\partial \phi^1} & \frac{\partial G_7}{\partial \psi^1} & \frac{\partial G_7}{\partial \theta^2} & \frac{\partial G_7}{\partial \phi^2} & \frac{\partial G_7}{\partial \psi^2} & \frac{\partial G_7}{\partial \theta^3} & \frac{\partial G_7}{\partial \phi^3} & \frac{\partial G_7}{\partial \psi^3} \end{bmatrix}$$ Equation (31)

Example

FIGS. 17A-17C show examples of three 3-D pre-models (3-D facial point cloud) with three different poses that are transformed into the UCS domain. FIG. 17A is an example of the registered face model from a face pre-model with the left (30 degree) pose, FIG. 17B is an example of the registered face model from a face pre-model with the frontal (0 degree) pose, and FIG. 17C is an example of the registered face model from a face pre-model with the right (−30 degree) pose. The various poses may be aligned with the frontal pose in the UCS domain. The holes in the right or left poses are due to the self-occlusion of the face (e.g., the nose).

Figure 18E:
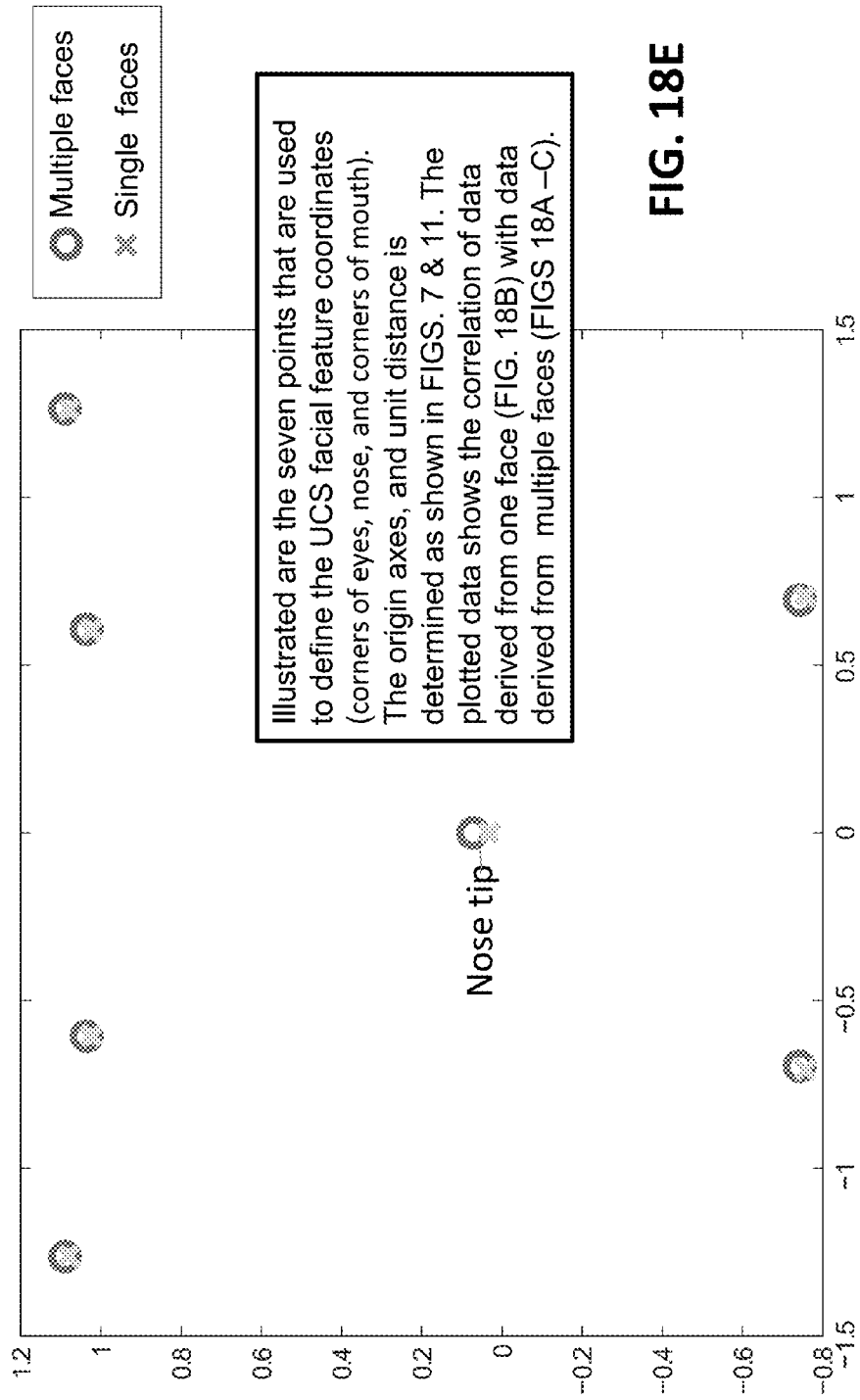

FIG. 18 shows the preferred embodiment transformation results on the same subject using the single face approach vs. multiple face approach. FIG. 18A-C show three RGB images that correspond to three depth images with three different poses, that is, left, front, and right, respectively. FIG. 18D shows three groups of the preferred embodiment rotation parameters $\{P_r^i\}$, i=1, 2, 3 for three poses that are obtained using three face pre-models. They represent the correct orientations of three images that are the right, frontal, and left poses, respectively. Since the single face approach requires a complete set of seven landmark points from each face pre-model, it cannot apply to the left or right views that only partial landmark points are available. Therefore, the rotation parameters using the single face pre-model are not shown. The multiple face approach is suitable to deal with the scenario that only partial landmarks are available. The preferred embodiment face plane parameters $P_f$ that are obtained using three face pre-models and single face pre-model (frontal pose) are represented in FIG. 18E. In this example, the estimation result of using the multiple face approach is consistent with one of using the single face approach, except the locations of the nose tip from two approaches are slightly different.

Integrated Face Model from Multiple Registered Face Models

When there is multiple Kinect data available, multiple registered 3-D face models may be obtained for each subject. In order to unify the multiple 3-D models and reduce the noise, a face model fusion operation is performed to generate the integrated 3-D face model. First, a grid with M×N uniformly sampled bins is established. Then, multiple registered 3-D face models are placed into this grid. For each bin, outliers may first be removed using a median filter. If there are multiple points, $\{p_k\}$, k=1, ..., n, fall into one bin, the final depth value for the bin may be obtained by averaging, that is, $$\begin{aligned} x_{i,j} &= i, \\ y_{i,j} &= j, \\ z_{i,j} &= \frac{1}{n}\sum_{k=1}^{n} p_k(z); \\ 1 &\le i \le N, 1 \le j \le M. \end{aligned}$$ Equation (32)

After these steps, the integrated 3-D face model is constructed.

Example

Figure 19:
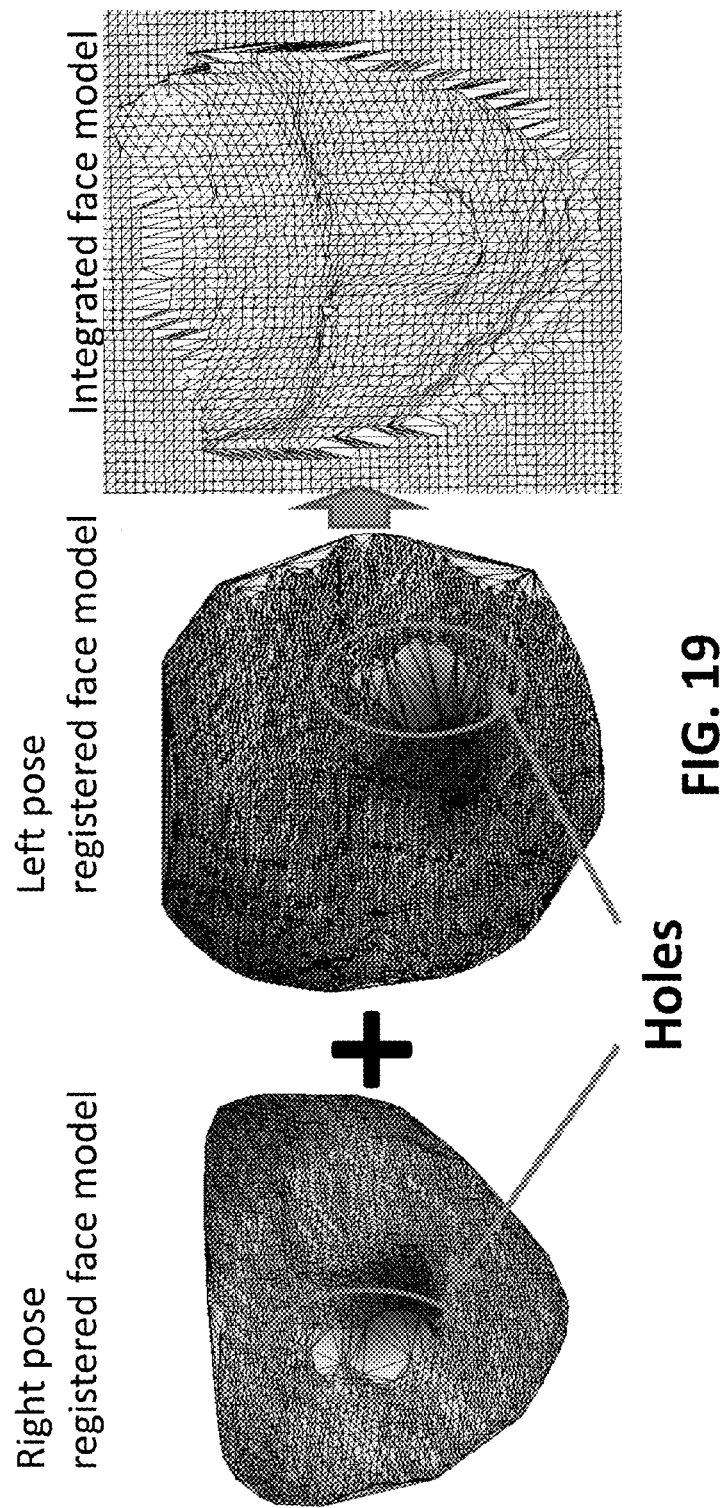
FIG. 19 is an illustration depicting an integrated face model that is obtained by fusing two registered face models, one has the right pose and one has the left pose.

FIG. 19 is an illustration depicting an integrated face model that is obtained by fusing two registered face models, one has the right pose and one has the left pose. The result in FIG. 19 shows that the integrated face model is more smooth and accurate than each face model with the individual pose. The holes in the right or left poses are due to the self-occlusion of the face (e.g., the nose).

Preferred Matching

When there is single pose input image one registered 3-D face model is obtained that is constructed from one face pre-model; referred to herein as a registered 3-D face model from single pose input. When there are multiple pose input images, one integrated 3-D face model may be constructed from multiple registered 3-D face models; referred to herein as an integrated 3-D face model from multiple pose input. Either a registered 3-D face model or an integrated 3-D face model is referred to as the final 3-D face model. In either case, the final 3-D face model is transformed into the unified coordinate system UCS domain using a preferred embodiment of the present invention.

In an alternate approach of preferred embodiment matching, the matching problem is formulated as a multiple hypotheses testing. In this matching approach, two methods are described: a) using facial landmark features and b) using geodesic distances between features. This alternate approach is depicted in Boxes 209-212 of FIG. 15.

Multiple Hypotheses Testing Based on Facial Landmark Features

In this multiple hypotheses testing formation, the gallery model, the probe model, and the decision rule are constructed.

Gallery Model:

The gallery contains M final 3-D face models that belong to M subjects. In the gallery model, the gallery is denoted by a set of M hypotheses, $$H_m, m=1,2,\ldots,M \quad \text{Equation (33)}$$

with a prior probabilities $$P_m = \text{Prob}(\text{Gallery generating } H_m). \quad \text{Equation (34)}$$

Probe Model:

The probe contains the test final 3-D face model that belongs to a test subject. The probe observation vector, R, contains N landmark measurement coordinates $(r_{xi}, r_{yi}, r_{zi})$, that is, $$\vec{R} = [r_{x1} r_{y1} r_{z1}, \ldots r_{xN} r_{yN} r_{zN}]. \quad \text{Equation (35)}$$

The coordinates of landmarks of the gallery are denoted as $(x_{mi}, y_{mi}, z_{mi})$. The coordinates from the probe face model and the gallery face model are related by some noise, this noise is assumed under the added white Gaussian noise model, called an AWGN model. Therefore, N landmark measurement coordinates $(r_{xi}, r_{yi}, r_{zi})$ are presented by using $$r_{xi} = x_{mi} + n_{xi}, r_{yi} = y_{mi} + n_{yi}, r_{zi} = z_{mi} + n_{zi}, i=1,2,\ldots N \quad \text{Equation (36)}$$

where $n_{xi}$'s, $n_{yi}$'s, and $n_{zi}$'s are independent identically distributed (iid) normal or Gaussian random variables with zero mean and variance $\sigma_n^2$, respectively, that is, $$E(n_{xi})=0, E(n_{xi}^2)=\sigma_n^2, E(n_{yi})=0, E(n_{yi}^2)=\sigma_n^2, E(n_{zi})=0, E(n_{zi}^2)=\sigma_n^2. \quad \text{Equation (37)}$$

The conditional probability in which the probability of the observation vector given the gallery generating $H_m$ is represented as follows, $$[p(\vec{R}/H_m)] = \frac{1}{(\sqrt{2\pi}\,\sigma_n)^{2N}} \exp\left[-\frac{\sum_{i=1}^{N}(r_{xi}-x_{mi})^2 + (r_{yi}-y_{mi})^2 + (r_{zi}-z_{mi})^2}{2\sigma_n^2}\right]. \quad \text{Equation (38)}$$

Decision Rule:

Under the above model, the multiple hypotheses testing theory allows us to develop the decision rule as shown in the following:

$$p(\vec{R}/H_k) \overset{>\text{not } H_m}{\underset{<\text{not } H_k}{\gtrless}} p(\vec{R}/H_m) \quad \text{Equation (39)}$$

or $$\max_m [p(\vec{R}/H_m)]. \quad \text{Equation (40)}$$

By manipulating the equation in (36):

$$\min_m \sum_{i=1}^{N}(r_{xi}-x_{mi})^2 + (r_{yi}-y_{mi})^2 + (r_{zi}-z_{mi})^2. \quad \text{Equation (41)}$$

In summary, our decision rule is to calculate the minimum value according to Equation (41) between the test subject in the probe and M subjects in the gallery. The subject in that results the minimum value in Equation (41) is claimed as the right match to the test subject.

The theory of multiple hypotheses testing shows that the cost function of this decision rule in Equation (41) is optimal to minimize probability of error under the added white Gaussian noise (AWGN) measurement model.

Multiple Hypotheses Testing Using Geodesic Distances Between the Features

The above cost function in Equation (39) is formulated based on the facial landmark features. It can also be formulated using the geodesic distances between the features. This takes advantage of the 3-D face data that is obtained from the Kinect sensor. This is a more accurate matching metric given the registered 3-D face model.

In the following, the computation of the geodesic distance and the decision rule based on the geodesic distances between face landmarks are described.

Computation of the Geodesic Distance

Figure 20:
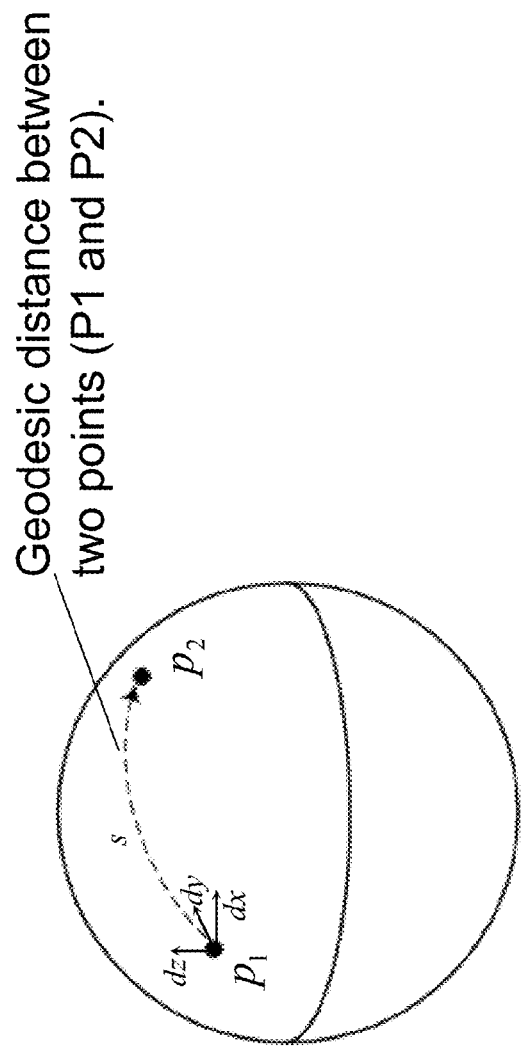
FIG. 20 illustrates the process of computing geodesic distance.

Geometrically, for a given surface $z = f(x,y)$ and two points $p_1$ and $p_2$ on the surface, the geodesic distance between $p_1$ and $p_2$ is defined as $$D_g(p_1, p_2) = \int_{p_1}^{p_2} ds = \int_{p_1}^{p_2} \sqrt{dx^2 + dy^2 + dz^2} \quad (42)$$

where s is shortest path between $p_1$ and $p_2$ on the 3-D surface, dx, dy and dz are the differential unit along the x, y and z axis, respectively, as shown in FIG. 20. According to (42), the geodesic distance is the shortest distance between two points on a curved surface.

However, computing the geometric shortest path on a polyhedral is a classical NP-hard problem. Our approach is to approximate the solution by mapping the problem to a graph shortest path and solving it using the Dijkstra's algorithm (see E. W. Dijkstra, "A Note on two Problems in Connexion with Graphs", Numerische Mathematik 1, 269-271, 1959) (herein incorporated by reference).

In the discrete case, it can be assumed that the 3-D facial surface is discretized to a triangular mesh with N vertices, $\{x_i\}$, $i=1,\ldots,N$. The geodesic distance $D_g(x_1, x_2)$ between vertices $x_1$ and $x_2$ can be approximated as the length of the shortest piecewise linear path on the mesh surface, that is, $$D_g(x_1, x_2) = \min_P L(P(x_1, x_2)) \quad (43)$$

where $P(x_1, x_2)$ is the path from $x_1$ to $x_2$ defined as an ordered sequence of adjacent vertices and $L(\cdot)$ is the length of the path computed as the sum of edges.

In order to increase the accuracy of the graph approximation, Steiner points may be added on each edge as additional vertices. $P(x_1, x_2)$ is determined using Dijkstra's algorithm. An initial vertex sequence list $\{x_1\}$ may be created that only contains the source vertex $x_1$ and set its distance to the source as zero. The distances from the source $x_1$ to all other vertices that are not in the list to infinity are set. Assume $x_i$ is a vertex on the path whose shortest distance path $P(x_1, x_i)$ has already been found. Let $x_j$ be a vertex in the neighborhood of $x_i$. The distance of $x_1$ and $x_j$ are updated as $$\min\{L(P(x_1, x_1)) + L(P(x_i, x_j)), L(P(x_1, x_j))\} \quad (44)$$

where $L(P(x_i, x_j))$ is the Euclidean distance between $x_i$ and $x_j$, $x_j$ is in the neighborhood of $x_i$. The path sequence may be updated until the destination vertex $x_2$ is added. The length of the final path is returned as the geodesic distance between $x_1$ and $x_2$.

Example

FIGS. 21A through 21C illustrate 3 examples of the geodesic distances computed between the facial landmarks. FIG. 21A illustrates the geodesic distance between the corners of right eye. FIG. 21B illustrates the geodesic distance between the corners of mouth. FIG. 21C illustrates the geodesic distance between the nose tip and the left eye inner corner.

Decision Rule Based on the Geodesic Distances

Since the geodesic distance is determined by the positions of feature points and the face shape from the 3-D face data, using the geodesic distances in the decision rule is a more robust matching criterion than using the face landmark positions.

When the geodesic distances in the decision rule are used, the observation vectors are replaced with the geodesic distances in the gallery and the probe models that are described in the previous section. Now, the probe observation vector, $\vec{R}$, that was described in Equation (35), contains N geodesic distances:

$$\vec{R} = [\tilde{D}_{g1}, \tilde{D}_{g2}, \ldots \tilde{D}_{gN}]. \quad \text{Equation (45)}$$

A geodesic distance $D_g$ can be calculated between any pair of facial landmarks. Since there are seven landmarks, there can be at most 32 pairs of landmarks. Therefore the maximum value of N is 32. To reduce computational time and select reliable geodesic distances, certain pair combinations of geodesic distances are utilized. For example, geodesic distances between the following landmarks can be used: nose to left eye center ($D_{g1}$), nose to right eye center ($D_{g2}$), and nose to mouse center ($D_{g3}$).

The added white Gaussian noise (AWGN) model can be used to relate the geodesic distances from the probe model and the gallery model. By substituting $D_g$ into Equations (36)-(40), the following decision rule is created:

$$\min_m \sum_{i=1}^{N} (\tilde{D}_{gi} - D_{gi})^2 \quad \text{Equation (46)}$$

where $\tilde{D}_{gi}$, i=1, ... N, is the geodesic distance between a pair of the facial landmarks in the probe, $D_{gi}$, i=1, ... N, is the geodesic distance between a pair of the facial landmarks in the gallery, N is the number of the geodesic distances.

In summary, a decision rule is used to calculate the minimum value according to Equation (46) between the test subject in the probe and M subjects in the gallery. The subject m that results in the minimum value in Equation (46) is claimed as the right match to the test subject.

Example

The following test examples and results help to further explain the invention. However, the examples are illustrative of the invention and the invention is not limited only to these examples.

Experiments are performed on the dataset provided in the publication by B. Y. Li, A. S. Mian, W. Liu and A. Krishna, entitled "Using Kinect for face recognition under varying poses, expressions, illumination and disguise", IEEE Workshop on Applications of Computer Vision, Tampa, Fla. (2013), herein incorporated by reference. The depth images of frontal, left (30 degrees) and right (−30 degrees) poses are used as the gallery images to emulate three depth images of three poses acquired by the multiple Kinect sensor system. For the probe image, another arbitrary pose is chosen to emulate the uncontrolled environment. The recognition results of matching scores of 10 cross-compared faces are shown in the table in FIG. 22. The table shows the confusion matrix of the matching scores. In FIG. 22, the numbers along the top (read horizontally) correlate to the same individuals represented by the numbers 1 through 10 on the vertical axis. The numbers 1-10 along the top correlate in effect to the "probe" images and the numbers 1-10 along the vertical axis correlates to images of persons from the gallery. The probe images, although the same individuals, may have been taken from different poses. Using equation (46), the distant differences between feature points in every probe-gallery image pair are computed and reported in the table and are referred to as "Matching Scores." The lower scores indicate the differences are small. The blocks with the lowest scores appearing diagonally across FIG. 22 represent a "match."

The matching scores are calculated using the Equation (46), where N is the number of the geodesic distances. In this example, N is 3, that is, three geodesic distances between the following landmarks are: between the corners of right eye ($D_{g1}$), between the corners of mouth ($D_{g2}$), and between the nose tip and the left eye inner corner ($D_{g3}$), as shown in the example in FIG. 17, where $\tilde{D}_{gi}$, i=1, ... 3, in Equation (46) is the geodesic distance between a pair of the facial landmarks in the probe, $D_{gi}$, i=1, ... 3, is the geodesic distance between a pair of the facial landmarks in the gallery. The geodesic distances $\tilde{D}_{gi}$, i=1, ... 3 and $D_{gi}$, i=1, ... 3 are calculated according to Equation (42).

The low matching score represents the correct matching. The diagonal elements represent the matching pairs. The non-diagonal elements represent the non-matching pairs. The results show that the matching pairs have lower scores and non-matching pairs have higher scores.

Although various preferred embodiments of the present invention have been described herein in detail to provide for complete and clear disclosure, it will be appreciated by those skilled in the art that variations may be made thereto without departing from the spirit of the invention. It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

As used herein, the term "optimal" means most desirable or satisfactory result for an application or applications.

As used herein the terminology "geodesic" means the shortest line between two points that lies in a given surface.

As used herein center or centers of the corners of eyes is determined by determining the mid-point of a line between the corners of the eyes.

As used herein, the terminology "transform," "transforming," or "transformation" is to be interpreted as defined in Merriam Webster Dictionary: "the operation of changing (as by rotation or mapping) of one configuration or expression into another in accordance with a mathematical rule; especially: a change of variables or coordinates in which a function of new variables or coordinates is substituted for each original variable or coordinate . . . the formula that effects a transformation."

As used herein, the terminology "estimating" or "estimate" means to roughly calculate or judge the value, number, quantity, or extent of, calculate roughly; approximate.

As used herein, the terminology "alert" means a message or signal, such as a quick notice of any unusual and potentially dangerous or difficult circumstances; or possible danger; a warning of a danger, threat, or problem, typically with the intention of having it avoided or dealt with by those person to which the alert is sent.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

The invention claimed is:

1. A method of facial recognition comprising:
    inputting image data representing a plurality of images from a database; the database comprising images of people wherein the location of the three dimensional facial features is defined relative to a predetermined common plane;
    inputting an image of a subject to be identified;
    locating predetermined three-dimensional facial features in the image of the subject for comparison to the image data from the database;
    estimating three-dimensional facial feature location coordinates of the subject head in the image of the subject;
    obtaining the three-dimensional facial feature location coordinates and orientation parameters in a coordinate system in which the facial features are located in the predetermined common plane;
    comparing the location of the coordinates of the subject to the locations of the coordinates of the images of people in the database relative to the predetermined common plane; and
    determining the identity of the subject.

2. The method of claim 1 wherein the facial features are eyes, nose and mouth of a subject and wherein the coordinates of the location of the facial features are defined as the location of eye corners, nose tip and mouth corners; and wherein the predetermined common plane is a vertical plane passing the midpoints of the eye corners and mouth corners; and wherein the orientation parameters correlate to the yaw pitch and roll of the subject's head.

3. The method of claim 1 wherein the step of obtaining the three-dimensional facial feature location coordinates and orientation parameters comprises estimating the three-dimensional orientation of the subject's head; and wherein the predetermined common plane comprises the midpoints of the corners of the eyes and corners of the mouth.

4. The method of claim 2 wherein the yaw, pitch and roll of each head in the database of images of people is approximately the same since all facial features are specified relative to a predetermined common plane comprising the centers of the eye corners and mouth corners; and wherein the centers of the eye corners and mouth corners are located in a vertical plane.

5. The method of claim 1 wherein a plurality of geodesic distances between facial coordinates of the subject are determined and matched against the geodesic distances between facial coordinates of the image data in the database.

6. The method of claim 1 wherein the step of inputting an image of a subject to be identified comprises generating point clouds and surface meshes depicting the subject's head using at least one three-dimensional image sensor.

7. The method of claim 1 wherein the step of obtaining three-dimensional facial feature location coordinates and orientation parameters comprises estimating the three dimensional orientation of the subject's head and scale; and further comprises transforming the three-dimensional facial feature location coordinates of the corners of the eyes, nose tip, and corners of the mouth of the subject into corresponding coordinates relative to a vertical plane containing the midpoints of the corners of the eyes and corners of the mouth using a Gaussian Least Squares Differential Correction (GLSDC) minimization procedure.

8. The method of claim 1 wherein the predetermined common plane is a vertical plane comprising the midpoints of the corners of the eyes and corners of the mouth.

9. A method of facial recognition comprising:
    for each image of a person in a database:
        locating predetermined three-dimensional facial features in the image of the person;
        estimating three-dimensional facial feature location coordinates;
        obtaining the three-dimensional facial feature location coordinates and orientation parameters relative to a coordinate system defined by the location of facial features relative to the predetermined common plane;
    inputting image data representing a plurality of images from the database;
    inputting an image of a subject to be identified;
    locating predetermined three-dimensional facial features in the image of the subject for comparison to the image data from the database;
    estimating three-dimensional facial feature location coordinates of the subject head in the image of the subject;
    obtaining the three-dimensional facial feature location coordinates and orientation parameters in a coordinate system in which the facial features are located in the predetermined common plane;
    comparing the location of the coordinates of the subject to the locations of the coordinates of the images of people in the database; and
    determining the identity of the subject.

10. The method of claim 9 wherein the step of obtaining the three-dimensional facial feature location coordinates and orientation parameters comprises using a Gaussian Least Squares Differential Correction (GLSDC) minimization procedure.

11. The method of claim 9 further comprising determining the geodesic distances between at least two of the facial features; and wherein the step of comparing the location of the coordinates of the subject to the locations of the coordinates of the images of people in the database comprises comparing the geodesic distances between at least two of the facial features.

12. The method of claim 1 wherein the inputting of an image of a subject to be identified comprising combining a plurality of images to form an image of the subject.

13. A system for facial recognition comprising:
  at least one processor;
  at least one input operatively connected to at least one processor and configured to input at least one image of a subject to be identified;
  a database configured to store three-dimensional facial image data comprising facial feature coordinates in a predetermined common plane;
  the at least one processor configured to locate predetermined three-dimensional facial features in the image of the subject, estimate three-dimensional facial feature location coordinates of the subject head in the image of the subject, and obtain the three-dimensional facial feature location coordinates and orientation parameters relative to a predetermined common plane; and compare the locations of the facial feature coordinates of the subject to the three-dimensional facial image data in the database relative to the predetermined common plane;
  whereby recognition likeness of the facial images is determined by comparing the predetermined common plane facial feature coordinates of the subject to the predetermined common plane facial feature coordinates of the images in the database.

14. The system of claim 13 wherein the facial features are eyes, nose and mouth of a subject and wherein the facial features coordinates are the location of eye corners, nose tip and mouth corners; and wherein the predetermined common plane is a vertical plane containing the centers of the eye corners and mouth corners; and wherein orientation parameters correlate to the yaw pitch and roll of the subject's head.

15. The system of claim 13 wherein the predetermined common plane is a vertical plane containing centers of the corners of eyes and mouth corners.

16. The system of claim 13 wherein the database is configured to store a plurality of geodesic distances between facial feature coordinates of the images of people in the database and the at least one processor determines geodesic distances between facial feature coordinates of the subject and matches the geodesic distances against the geodesic distances between facial coordinates of the images of people in the database.

17. The system of claim 13 further comprising at least one three-dimensional image sensor configured to generate point clouds and surface meshes depicting the subject's head.

18. The system of claim 13 wherein the at least one processor is configured to obtain the three-dimensional facial feature location coordinates and orientation parameters in a coordinate system in which the facial features are located in the predetermined common plane using a Gaussian Least Squares Differential Correction (GLSDC) minimization procedure.

19. A method of facial recognition comprising:
  inputting image data representing a plurality of images from a database; the database comprising images of people wherein the location of the facial features is defined relative to a predetermined common plane;
  inputting a plurality of images of a subject to be identified from at least one image sensor;
  locating predetermined three-dimensional facial features in the image of the subject for comparison to the image data from the database;
  estimating three-dimensional facial feature location coordinates of the subject head in the image of the subject;
  obtaining the three-dimensional facial feature location coordinates and orientation parameters in a coordinate system in which the facial features are located in the predetermined common plane;
  comparing the location of the coordinates of the subject to the locations of the coordinates of the images of people in the database relative to the predetermined common plane; and
  determining the identity of the query subject.

20. The method of claim 19 wherein the method is used for one of authentication and surveillance and further comprising:
  selectively activating a device based upon the likeness, resemblance of the subject to images of people in the database; and wherein the step of obtaining the three-dimensional facial feature location coordinates and orientation parameters comprises using a Gaussian Least Squares Differential Correction (GLSDC) minimization procedure.

* * * * *